US012390950B2

(12) United States Patent
Duxbury

(10) Patent No.: US 12,390,950 B2
(45) Date of Patent: Aug. 19, 2025

(54) FENCE STOP SYSTEM FOR A SAW AND METHOD THEREOF

(71) Applicant: Woodpeckers, LLC, Strongsville, OH (US)

(72) Inventor: Nathan William Duxbury, Northfield, OH (US)

(73) Assignee: WOODPECKERS, LLC, Strongsville, OH (US)

( * ) Notice: Subject to any disclaimer, the term of this patent is extended or adjusted under 35 U.S.C. 154(b) by 773 days.

(21) Appl. No.: 17/469,288

(22) Filed: Sep. 8, 2021

(65) Prior Publication Data

US 2023/0073793 A1 Mar. 9, 2023

(51) Int. Cl.
*B27B 27/02* (2006.01)
*B27B 27/10* (2006.01)

(52) U.S. Cl.
CPC .............. *B27B 27/02* (2013.01); *B27B 27/10* (2013.01)

(58) Field of Classification Search
CPC ......... B27B 27/00; B27B 27/02; B27B 27/08; B27B 27/10
See application file for complete search history.

(56) References Cited

U.S. PATENT DOCUMENTS

| | | | | |
|---|---|---|---|---|
| 1,938,548 | A * | 12/1933 | Tauts | B23Q 1/74 83/438 |
| 2,787,301 | A | 4/1957 | Anderson | |
| 2,966,176 | A | 12/1960 | Gaskell | |
| 4,256,000 | A | 3/1981 | Seidel | |
| 4,658,687 | A * | 4/1987 | Haas | B27B 27/02 83/477.1 |
| 4,693,158 | A * | 9/1987 | Price | B23Q 16/001 144/287 |
| 5,018,562 | A | 5/1991 | Adams | |
| 5,038,486 | A | 8/1991 | Ducate, Sr. | |
| 5,088,881 | A | 2/1992 | Ball et al. | |

(Continued)

FOREIGN PATENT DOCUMENTS

| | | |
|---|---|---|
| EP | 1671763 | 6/2006 |

OTHER PUBLICATIONS

Woodpeckers, Repeatable Rip Cuts with Track Saw, Mar. 28, 2019, youtube.com, available on Apr. 15, 2022 at: hyyps://www.youtube.com/watch?v=CueU1JbO-WU (Year: 2019).

*Primary Examiner* — Adam J Eiseman
*Assistant Examiner* — Richard D Crosby, Jr.
(74) *Attorney, Agent, or Firm* — Sand, Sebolt & Wernow Co., LPA

(57) ABSTRACT

A fence stop system for a table saw includes a fence stop that has a stop surface that is moveable between first and second positions. In the first position, the stop surface is disengaged from a portion of a table saw fence. In the second position, the stop surface engages the portion of the table saw fence. The fence stop includes a micro adjustment mechanism to "dial in" an exact measurement for a rip or cut. The fence stop system may additionally include a second fence stop that can be coupled to the first fence stop to create a mated pair. When the stop surfaces are in their second positions (i.e., stopping position), part of the table saw fence is disposed between the respective stop surfaces that allow the fence to translate between the stop surfaces to effectuate a dado cut in the wood.

18 Claims, 27 Drawing Sheets

(56) References Cited

U.S. PATENT DOCUMENTS

| | | | | |
|---|---|---|---|---|
| 5,181,446 | A * | 1/1993 | Theising | B27B 27/10 83/438 |
| 5,299,609 | A | 4/1994 | Wedler | |
| 5,337,641 | A * | 8/1994 | Duginske | B27B 27/02 33/468 |
| 5,340,252 | A | 8/1994 | Weddendorf | |
| 5,617,909 | A * | 4/1997 | Duginske | B27B 27/10 403/381 |
| 5,647,258 | A * | 7/1997 | Brazell | B27B 27/02 83/438 |
| 5,722,308 | A * | 3/1998 | Ceroll | B27B 27/02 144/287 |
| 5,768,966 | A | 6/1998 | Duginske | |
| 5,845,555 | A * | 12/1998 | Dawley | B23Q 16/006 83/467.1 |
| 6,293,176 | B1 * | 9/2001 | Talesky | B23D 47/025 144/287 |
| 6,360,641 | B1 * | 3/2002 | Talesky | B27B 27/02 83/438 |
| 6,360,642 | B1 * | 3/2002 | Miller | B27B 27/02 83/438 |
| 6,557,601 | B1 | 5/2003 | Taylor | |
| 6,601,492 | B1 | 8/2003 | Crofutt | |
| 6,647,847 | B2 * | 11/2003 | Hewitt | B27B 27/10 83/477.2 |
| 6,679,305 | B2 * | 1/2004 | Petersen | B27B 27/08 83/440 |
| 6,712,574 | B1 | 3/2004 | Roopnarine | |
| D535,671 | S | 1/2007 | Bernhardt | |
| 7,404,350 | B2 * | 7/2008 | Chuang | B27B 27/10 83/438 |
| D578,145 | S | 10/2008 | Bernhardt | |
| 7,441,487 | B2 * | 10/2008 | Liu | B23D 47/025 83/438 |
| D646,541 | S | 10/2011 | Andresen | |
| 8,915,172 | B1 * | 12/2014 | Hood | B27B 27/02 83/477.2 |
| 9,095,989 | B2 * | 8/2015 | Chang | B27B 27/08 |
| 9,259,850 | B2 * | 2/2016 | Hendrickson | B27B 27/02 |
| 9,272,439 | B2 * | 3/2016 | Dammertz | B27B 27/10 |
| 9,302,371 | B2 * | 4/2016 | Chen | B25B 11/00 |
| 9,592,623 | B2 * | 3/2017 | Frolov | B27B 27/08 |
| D816,453 | S | 5/2018 | Hansen et al. | |
| 10,357,893 | B1 * | 7/2019 | Frolov | B27B 27/02 |
| 10,576,653 | B2 * | 3/2020 | Frolov | B23Q 3/005 |
| D918,685 | S | 5/2021 | Eilts et al. | |
| 11,358,299 | B2 * | 6/2022 | Huang | B27B 27/02 |
| 2002/0108480 | A1 * | 8/2002 | Hewitt | B27B 27/02 83/477.2 |
| 2004/0107812 | A1 * | 6/2004 | Yu | B27B 27/02 83/438 |
| 2005/0268764 | A1 * | 12/2005 | Hadaway | B27B 27/10 83/13 |
| 2006/0266182 | A1 | 11/2006 | Balolia | |
| 2011/0296968 | A1 | 12/2011 | Doumani | |
| 2011/0303064 | A1 | 12/2011 | Wang | |
| 2012/0036974 | A1 | 2/2012 | Koegel | |
| 2016/0332242 | A1 * | 11/2016 | Fiala | B27B 27/08 |
| 2019/0105797 | A1 * | 4/2019 | Chang | B27B 27/10 |
| 2019/0202080 | A1 * | 7/2019 | Frolov | B27B 27/02 |
| 2019/0270143 | A1 | 9/2019 | Duginske | |
| 2020/0361114 | A1 * | 11/2020 | Wixey | B23D 59/001 |
| 2021/0178628 | A1 * | 6/2021 | Shiel | B27B 27/02 |

* cited by examiner

FIG.3
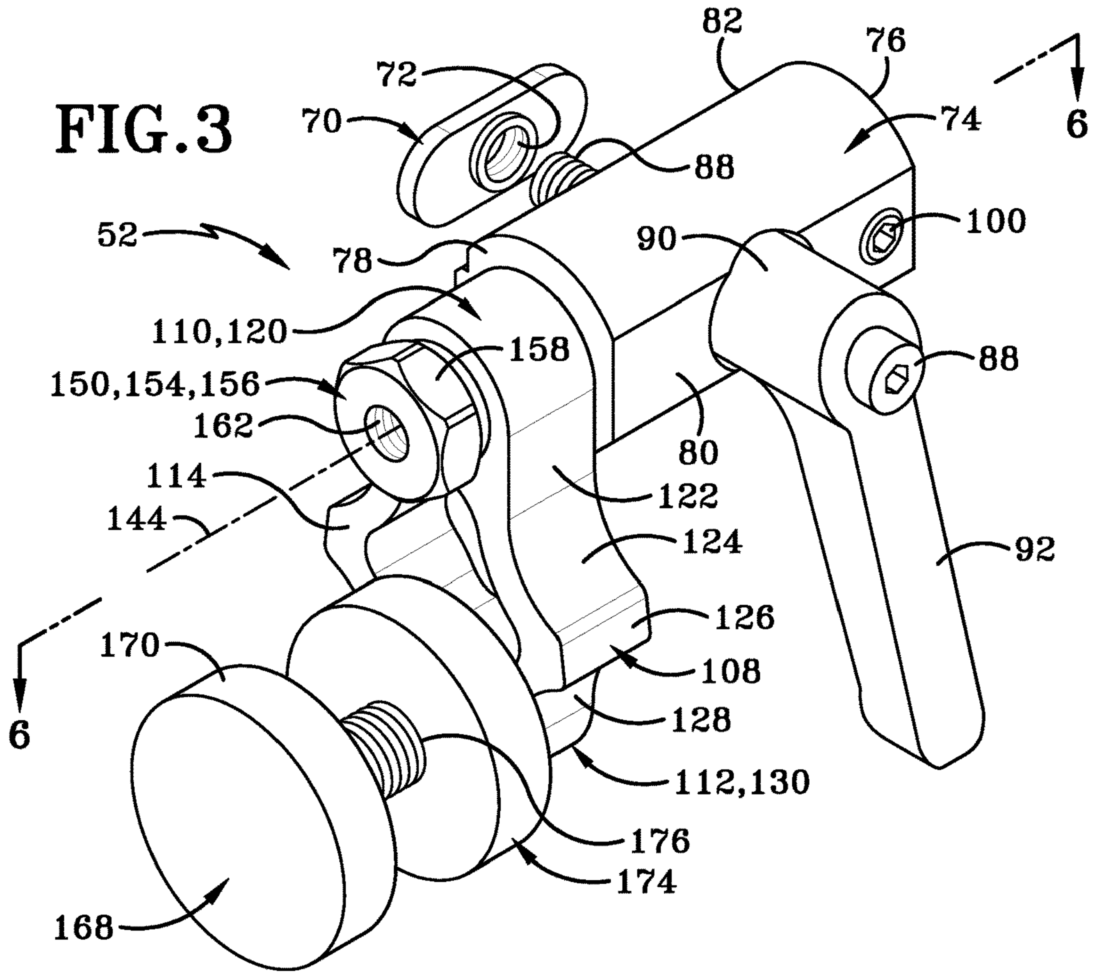
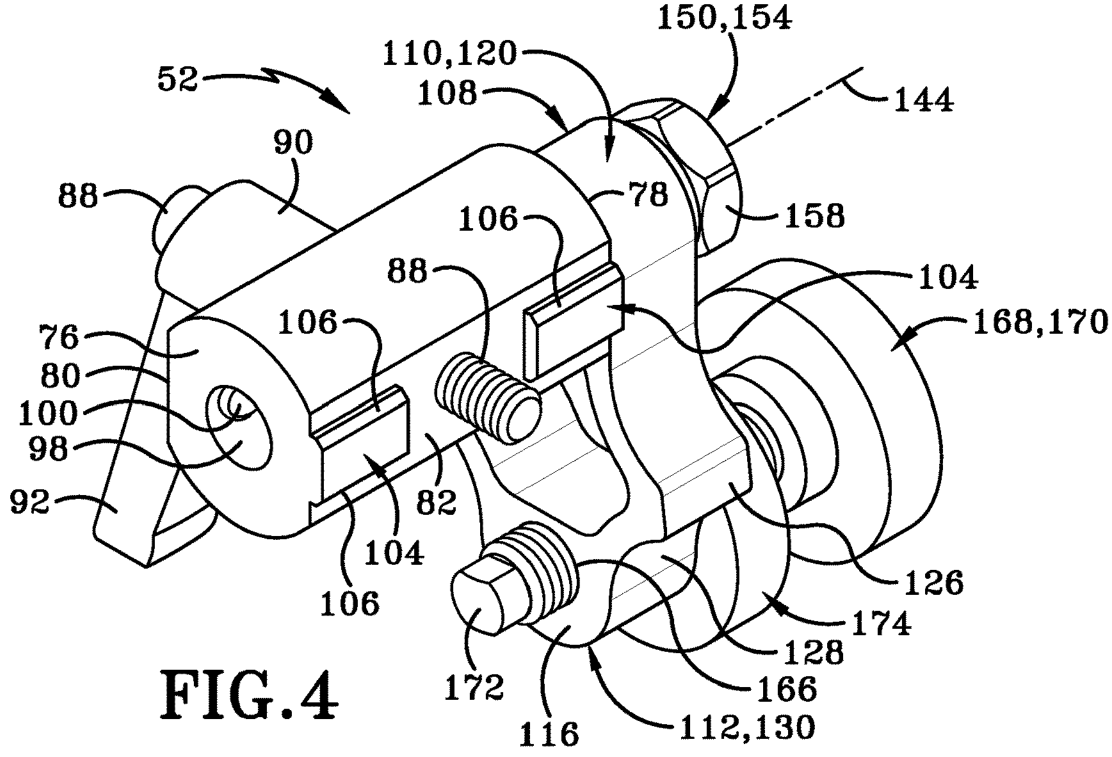
FIG.4

FENCE STOP SYSTEM FOR A SAW AND METHOD THEREOF

TECHNICAL FIELD

This disclosure is directed to a fence stop and method of use thereof for a table saw. More particularly, the present disclosure is directed to a fence stop for a table saw that includes one or more fence stops for selective adjustment of a fence for a table saw that also enables a dado to be cut.

BACKGROUND

Woodworkers often cut or rip large pieces of wood or plywood via a table saw. When using a table saw, woodworkers are also often required to make numerous cuts of wood having similar dimensions. This is common in cabinet making where the cabinets all have similar dimensions.

Table saws have a fence that acts a guide for the piece of wood as it is cut or ripped. However, it is common for the fence to need to be moved to another location, at least temporarily, for a variety of reasons. When the woodworker needs to return to cut a piece of wood having a similar dimension prior to moving the fence, there is uncertainty whether the second piece of wood will have the same dimension because it is difficult to truly return the fence to its original location.

Different from table saws, other types of woodworking saws have used fence stops. For example, fence stops are known to exist for miter saws and jig saws. However, these require unique configurations for the particular type of saw and are not able to be used for table saws.

SUMMARY

Thus, it has been recognized that a need exists for a fence stop for use with a table saw. The present disclosure addresses this need and other needs by providing a fence stop system for a table saw. In addition to the fence stop for a table saw, a need has also been addressed that enables the fence stop system to allow a table saw to perform a dado cut in a piece of wood or board by selective alignment of two mated fence stops.

In one aspect, an exemplary embodiment of the present disclosure provides a fence stop system for a table saw includes a fence stop that has a stop surface that is moveable between first and second positions. In the first position, the stop surface is disengaged from a portion of a table saw fence. In the second position, the stop surface engages the portion of the table saw fence. The fence stop includes a micro adjustment mechanism to "dial in" an exact measurement for a rip or cut. The fence stop system may additionally include a second fence stop that can be coupled to the first fence stop to create a mated pair. When the stop surfaces are in their second positions (i.e., stopping position or raised position), part of the table saw fence is disposed between the respective stop surfaces that allow the fence to linearly translate between the stop surfaces to effectuate a dado cut in the wood.

According to one example, the fence stop system for a table saw in the present disclosure provides a "flip stop" or fence stop for a rip fence for a table saw. One exemplary commercial embodiment of the present disclosure is commercially available for sale by Woodpeckers, LLC, an Ohio limited liability company, and is known as the Rip-Flip Fence Stop System. The exemplary fence stop system for a table saw is advantageous for wood workers such as cabinet manufacturers who are consistently manufacturing rail and stile doors, amongst other types of items. In one example, the rail and stile, and face frame construction are typically all cut at a certain dimension; for example, 2⅛ inch. The fence stop of the present disclosure may be installed on a rail of a table saw assembly so as to always set the fence of the table saw to the 2⅛ inch dimension. The wood may be cut and ripped and then the fence stop can be flipped down below the rail, out of use, so that the fence may be adjusted to another dimension. When the fence stop is in the raised and engaged position (also known herein as the second position of the stop surface), it allows the wood worker to automatically and selectively set the fence at the desired dimension without having to double-check or look that the fence is in a correct position because it will always remain at that same position. The wood worker may then begin to rip and cut wood boards at the desired dimension. The fence stop system of the present disclosure enables a wood worker to easily change their position of their fence if desired by lowering the fence stop relative to the rail. Thereafter, the fence stop may be raised to cut the selected and set dimension again at another later time. This allows a wood worker to duplicate two pieces of wood stock that have the exact same dimensions.

The fence stop system of the present disclosure not only stops the fence in one direction but in two. Namely, the use of a second fence stop enables a wood worker to cut perfect fitting and square dados. For example, fence stop system of the present disclosure enables a wood worker to cut dados that are not traditionally able to be cut with a conventional dado blade. For example, with nominal quarter-inch plywood, which is actually under one-quarter inch, and with a typical dado blade the absolute minimum cut is the two outside blade dimensions which is a quarter of an inch. Thus, a nominal quarter-inch piece of plywood, typically used for the bottom or drawers, would be too sloppy and not square in the dado. The present disclosure enables two cuts or rips to be formed utilizing the first and second fence stops adjacent the fence to perform a perfect fitting dado for a nominal quarter-inch piece of plywood that has an actual dimension less than one-quarter inch using a standard one-eighth inch blade. To set up the fence stop system to perform a dado cut, the second fence stop is loosened relative to the rail and it is flipped such that the respective second ends of the first and second fence stops face each other. The first and second fence stops are coupled together via a coupling unit or coupler and secured together via set screws that may be tightened via an Allen key. The coupling of the first and second fence stops together enables them to slide as a mated pair or union along the length of the rail. Thereafter, the ratchet knobs associated with the handles may be tightened and lowered so they do not interfere with pivoting movement of the levers on the fence stop that carry the respective stopping surfaces of the first and second fence stops. The wood worker may then slide the table saw fence assembly to a location between the stopping surfaces of the respective first and second fence stops and raise the levers to position the stop surfaces associated with the first fence stop on one side of the fence and the stopping surface associated with the second fence stop on an opposite side of the fence. The depth the saw blade may then be set to a desired depth for the depth of the groove of the dado that is desired to be cut. In one example, assume the location of the dado needs to be one inch from the end of the plywood stock. The cursor looking through a viewport on the table saw rail may be moved to the one inch indicator and the fence is locked into position. Thereafter, the mated pair of fence stops may be slid beneath the fence in unison and the lever of the first fence stop raised to raise the stopping surface above the rail. A thumb screw or micro adjustment member connected to the stopping surface may then be maneuvered to engage the stop block on the fence. Then a first cut may be made for the dado. Thereafter, to enlarge the groove so that the plywood can go in, the saw needs to be brought a little closer to the blade. Then, the second stop will be raised and bring the stopping surface very close to, but not touching, the stop block on the other side of the fence. Then, the fence handle is raised and the fence is slightly moved over to alter the offset distance of the blade relative to the fence. Then, the board may be ripped a second time and cut to generate a dado that has a dimension equal to that of the nominal quarter-inch piece of plywood that actually has a dimension less than one-quarter inch. The wood worker may then install the nominal quarter-inch piece of plywood onto the wood via the square dado.

In yet another aspect, an exemplary embodiment of the present disclosure may provide a fence stop system for a table saw, the system comprising: a rail defining a channel, wherein the rail is adapted to be connected to a surface of a table saw assembly; a first fence stop that is moveable along the rail and selectively locked at a position along the rail, the first fence stop comprising: a stop surface that is moveable between a first position and a second position, wherein when in the stop surface is in the second position the stop surface abuts a portion of a table saw fence and when the stop surface is in the first position the stop surface does not contact the table saw fence. This exemplary embodiment or another exemplary embodiment may further provide wherein the first fence stop further comprises: a lever that pivots about an axis that is parallel the rail, wherein the lever pivots between a lowered position and a raised position; wherein the stop surface is carried by the lever, and the first position of the stop surface is associated with the lowered position of the lever and the second position of the stop surface is associated with the raised position of the lever. This exemplary embodiment or another exemplary embodiment may further provide wherein the stop surface is above the rail when the lever is in the raised position and is below the rail when the lever is in the lowered position. This exemplary embodiment or another exemplary embodiment may further provide wherein the first fence stop further comprises: a micro adjustment mechanism, wherein the stop surface is on the micro adjustment mechanism. This exemplary embodiment or another exemplary embodiment may further provide wherein the first fence stop further comprises: an aperture defined in the lever, wherein the micro adjustment mechanism extends through the aperture and positions the stop surface to one side of the lever. This exemplary embodiment or another exemplary embodiment may further provide wherein the micro adjustment mechanism comprises: a rotatable member and a lock, wherein when the lock of the micro adjustment mechanism is unlocked the rotatable member is adapted to be rotated to linearly translate the stop surface to impart adjusting movement to the table saw fence, and when the lock of the micro adjustment mechanism is locked the stop surface is fixed relative to the lever. This exemplary embodiment or another exemplary embodiment may further provide a second fence stop that is moveable along the rail and selectively locked at a second positon along the rail. This exemplary embodiment or another exemplary embodiment may further provide a stop surface on the second fence stop that is moveable between a first position and a second position, wherein when in the stop surface on the second fence stop is in the second position the stop surface of the second fence stop abuts a different portion of the table saw fence and when the stop surface of the second fence stop is in the first position the stop surface of the second fence stop does not contact the table saw fence. This exemplary embodiment or another exemplary embodiment may further provide a lock handle on the table saw fence disposed between the stop surface of the first fence stop and the stop surface of the second fence stop. This exemplary embodiment or another exemplary embodiment may further provide wherein the table saw fence is linearly moveable between a first engagement with the stop surface of the first fence stop and a second engagement with the stop surface of the second fence stop, wherein movement of the table saw fence between the stop surfaces of the first and second fence stops is adapted to cut a dado in a piece of wood. This exemplary embodiment or another exemplary embodiment may further provide wherein the second fence stop comprises: a second lever that pivots about an axis that is parallel the rail, wherein the second lever pivots between a lowered position and a raised position; a second stop surface carried by the second lever, wherein when in the second lever is in raised position the second stop surface abuts a portion of a table saw fence and when the second lever is in the lowered position the second stop surface does not contact the table saw fence. This exemplary embodiment or another exemplary embodiment may further provide a coupler to join the first fence stop and the second fence stop. This exemplary embodiment or another exemplary embodiment may further provide wherein the stop surface on the second fence stop is above the rail when a lever on the second fence stop is in a raised position and is below the rail when the lever on the second fence stop is in a lowered position. This exemplary embodiment or another exemplary embodiment may further provide wherein the first fence stop further comprises: a slide nut adapted to engage the rail and enable the first fence stop to slide relative to the rail. This exemplary embodiment or another exemplary embodiment may further provide wherein the first fence stop further comprises: a tapered aperture formed in a lever, wherein a pivot axis about which the lever pivots extends through the tapered aperture. This exemplary embodiment or another exemplary embodiment may further provide wherein the first fence stop further comprises: a body having first and second ends, and at least one flat side extending between the first and second ends, wherein the flat side of the body engages the rail. This exemplary embodiment or another exemplary embodiment may further provide wherein the first fence stop further comprises: a body having first and second ends, and bore formed in the first end adapted to receive a coupler to join the first fence stop with a second fence stop. This exemplary embodiment or another exemplary embodiment may further provide wherein the first fence stop further comprises: a lever having a flat surface configured to engage a frontal surface of the table saw assembly when the lever is in a raised position, wherein the raised position of the lever is associated with the second position of the stop surface, and the stop surface is carried by the lever. This exemplary embodiment or another exemplary embodiment may further provide a chamfered edge on the rail and a chamfered edge on a body of the first fence stop complementary to the chamfered edge on the rail. This exemplary embodiment or another exemplary embodiment may further provide wherein the first fence stop further comprises: a lever and a pivot axis, wherein the lever is rotatable about the pivot axis, and the pivot axis is aligned parallel to a longitudinal direction of the rail.

In yet another aspect, another exemplary embodiment of the present disclosure may provide a method comprising: coupling a rail of a fence stop system to a portion of a table saw assembly having a table saw fence; coupling a first fence stop to the rail; moving a stop surface between a first position and a second position, wherein when the stop surface is in the second position the stop surface abuts a portion of the table saw fence and when the stop surface is in the first position the stop surface does not contact the table saw fence. This exemplary method or another exemplary method may further provide sliding the first fence stop along the rail. This exemplary method or another exemplary method may further provide wherein sliding the first fence stop along rail moves the first fence stop in a direction perpendicular to a cutting direction of the table saw assembly. This exemplary method or another exemplary method may further provide moving a lever on the first fence stop from a lowered position to a raised position, wherein the lower position of the lever is associated with the first position of the stop surface and the raised position of the lever is associated with the second position of the stop surface. This exemplary method or another exemplary method may further provide wherein moving the lever on the first fence stop from the lowered position to the raised position is accomplished by pivoting the lever about a pivot axis oriented parallel to a length of the rail. This exemplary method or another exemplary method may further provide positioning the stop surface above the rail when the lever is in the raised position and position the stop surface below the rail when the lever is in the lowered position. This exemplary method or another exemplary method may further provide moving the stop surface via a micro adjustment mechanism on the first fence stop. This exemplary method or another exemplary method may further provide wherein moving the stop surface is accomplished by imparting linear translation to the stop surface via rotational action of a portion of the micro adjustment mechanism. This exemplary method or another exemplary method may further provide rotating a thumbwheel on the micro adjustment mechanism to linearly translate the stop surface. This exemplary method or another exemplary method may further provide locking the stop surface at a selected location via a lock wheel on the micro adjustment mechanism. This exemplary method or another exemplary method may further provide coupling a second fence stop to the rail; coupling the first fence stop to the second fence stop; and disposing a lock handle of the table saw fence between the stop surface on the first fence stop and a stop surface on the second fence stop. This exemplary method or another exemplary method may further provide cutting a dado in a piece of wood while the lock handle is disposed between the stop surface on the first fence stop and the stop surface on the second fence stop. This exemplary method or another exemplary method may further provide engaging a first portion of the table saw fence with the stop surface on the first fence stop; cutting a first portion of the dado; subsequent to cutting the first portion of the dado, engaging a second portion of the table saw fence with the stop surface on the second fence stop; and cutting a second portion of the dado. This exemplary method or another exemplary method may further provide adjusting the stop surface on the second fence stop via a second micro adjustment mechanism on the second fence stop. This exemplary method or another exemplary method may further provide unlocking the first and second fence stops relative to the rail; and sliding the first and second fence stops to a different position along the rail, wherein the first and second fence stop are slid as a mated pair. This exemplary method or another exemplary method may further provide cutting a second dado having a different offset distance from an edge of a piece of wood than the first dado. This exemplary method or another exemplary method may further provide moving the stop surface from the second position to the first position; and moving the first fence stop below the table saw fence to an opposite side of the table saw fence. This exemplary method or another exemplary method may further provide moving the stop surface from the second position to the first position; and moving the table saw fence over the first fence stop to position the first fence stop on an opposite side of the table saw fence. This exemplary method or another exemplary method may further provide unlocking the first fence stop relative to the rail such that the first fence stop may slide along the rail; unlocking a lock handle on the table saw fence; contacting a stop block on the table fence with the stop surface on the first fence stop; and moving the table saw fence and the first fence stop in unison while the stop block contacts the stop surface on the first fence stop. This exemplary method or another exemplary method may further provide revolving the stop surface around a pivot to move the stop surface between the first position and the second position.

In yet another aspect, an exemplary embodiment of the present disclosure may provide a method comprising: effecting a rail of a fence stop system to be coupled to a portion of a table saw assembly having a table saw fence; effecting a first fence stop to be coupled to the rail; effecting the first fence stop to be slid along the rail; effecting a stop surface to be moved between a first position and a second position, wherein when the stop surface is in the second position the stop surface abuts a portion of the table saw fence and when the stop surface is in the first position the stop surface does not contact the table saw fence; and effecting the stop surface to be adjusted via a micro adjustment mechanism on the first fence stop.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 3 is a top first side perspective view of one exemplary fence stop.

FIG. 4 is a top second side perspective view of the exemplary fence stop from FIG. 3.

Similar numbers refer to similar parts throughout the drawings.

DETAILED DESCRIPTION

Figure 1:
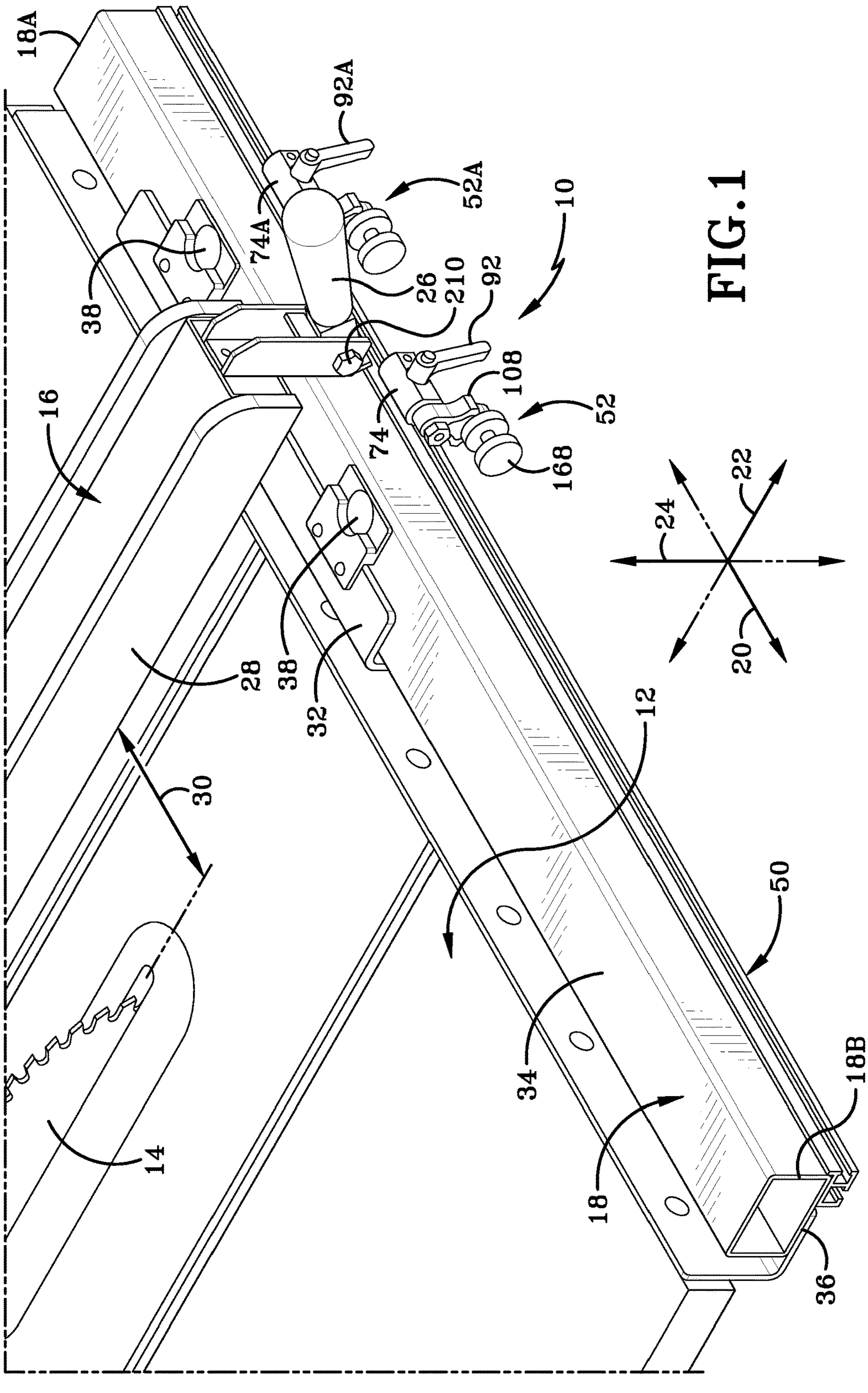
FIG. 1 is a top perspective view of a fence stop system for a table saw according to one embodiment of the present disclosure.

FIG. 1 depicts a fence stop assembly or system generally at 10. Fence stop system 10 attaches with a table saw assembly 12 including a saw blade 14 and a table saw fence 16 that is movable along or relative to a table saw rail 18. Table saw rail 18 includes a first end 18A and a second end 18B defining a first direction therebetween. The longitudinal length of the table saw rail 18 is aligned parallel with the first direction. The first direction is shown in FIG. 1 as being parallel to coordinate line 20. A second direction is perpendicular to coordinate line 20 and represented by coordinate line 22. The second direction is associated with the diameter or the "ripping" direction of the saw blade 14. A third direction parallel with coordinate line 24 is associated with the vertical direction of the table saw assembly 12. Inasmuch as the table saw assembly 12 is a table saw, and not another type of saw such as a miter saw or a jig saw, the saw blade 14 is one that extends upwardly through hole formed in a major planar surface of the table saw assembly, and is not a type of saw blade the pivots downwardly from above as is the case for miter saws.

The table saw fence 16 is slidable along the rail 18 in the first direction parallel with coordinate line 20. Fence 16 may be locked into a position via a lock handle 26. When the fence 16 is locked at a selected position along the length of rail 18, a first sidewall 28 of fence 16 is offset a distance 30 from blade 14 on table saw assembly 12.

Rail 18 additionally includes a bottom surface 36 opposite the top surface 34. The top surface 34 and bottom surface 36 are vertically aligned relative to the third direction parallel to coordinate line 24 perpendicularly intersects the major surfaces of the top surface 34 and the bottom surface 36. Table saw fence 16 additionally includes a slide bracket 32 that slides along or near the top surface 34 of rail 18. Slide bracket 32 may have at least one viewport 38 attached thereto. Viewport 38 is provided with a looking aperture to provide a user a viewport to see indicia or a ruler on the top surface 34 of rail 18 in order to set the desired offset distance 30 from the blade 14. When the fence sidewall 28 is locked in a desired position, the user may activate (i.e., electrically power/turn on) the blade 14 in order to cut or rip a piece of wood, such as plywood, in the ripping direction parallel to coordinate line 22.

Fence stop assembly or system 10 includes components that are connected to and used specifically in conjunction with table saw assembly 12. Particularly, fence stop assembly or system 10 includes a rail 50 (that is different from rail 18), a first fence stop 52, and a second fence stop 52A. The first fence stop 52 and the second fence stop 52A are moveable along or relative to the rail 50. IN one particular embodiment the first fence stop 52 and the second fence stop 52A are slidable along the rail 50. In one particular embodiment, first fence stop 52 and second fence stop 52A are identical. Accordingly, for brevity, reference will be made to the first fence stop 52 and identical features or components on the second fence stop 52A will be designated with the same reference numeral followed by the capital letter "A". However, it is possible and one would be motivated to slightly alter the fence stops to have different characteristics if necessary to achieve a desired application.

Figure 2:
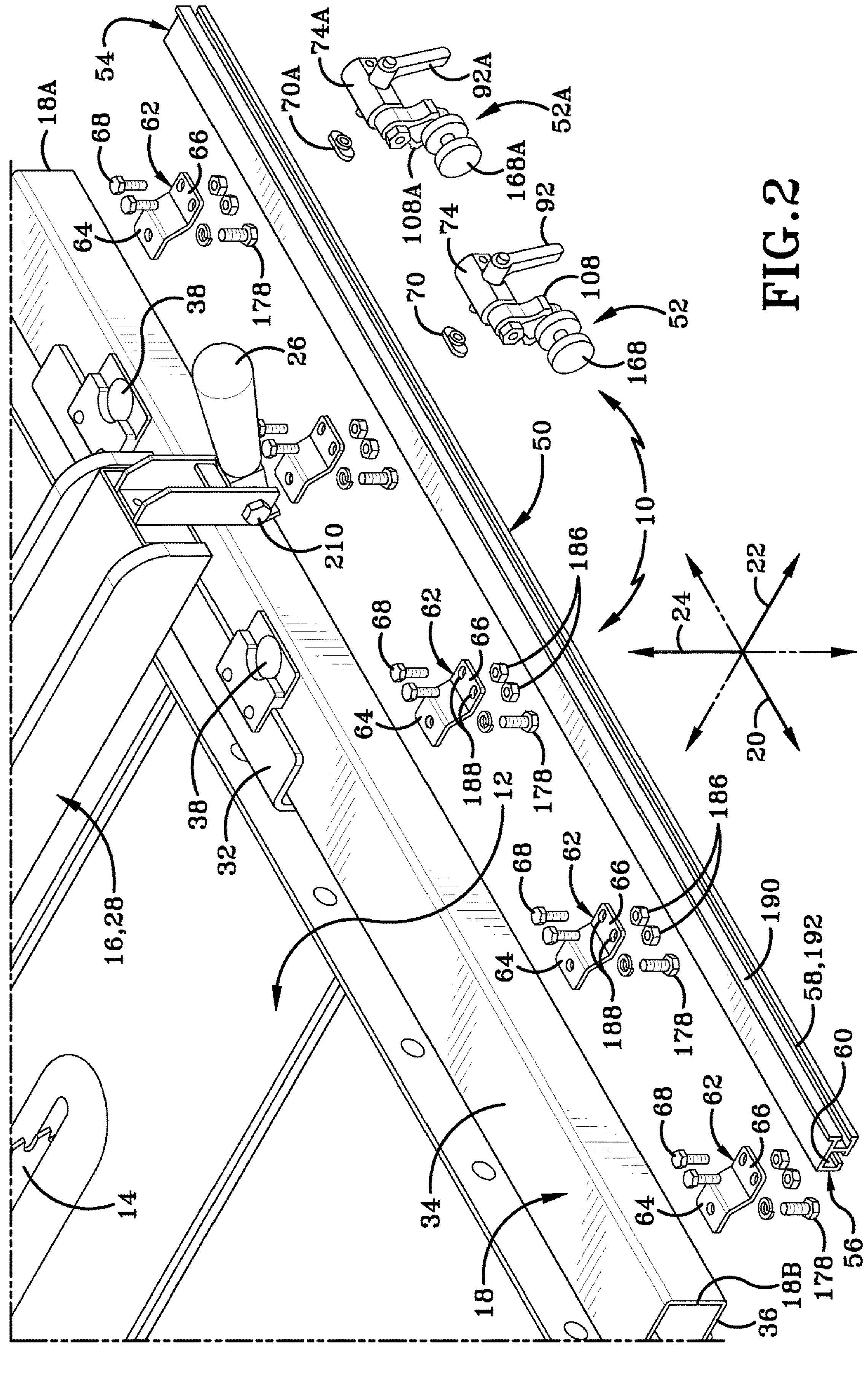
FIG. 2 is an exploded top perspective view of the fence stop system for a table saw.
Figure 5:
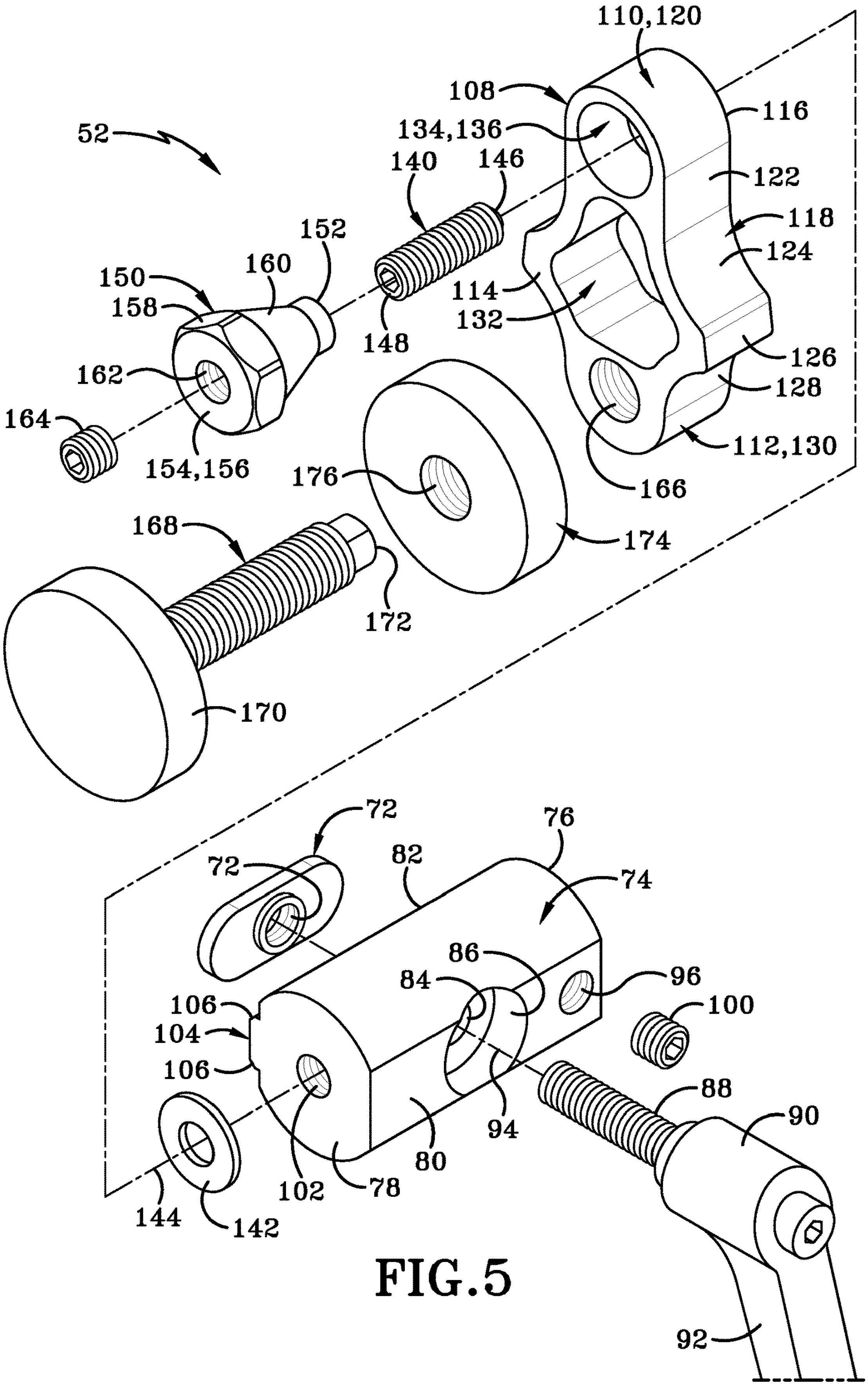
FIG. 5 is an exploded top first side perspective view of the exemplary fence stop from FIG. 3.

As shown in FIG. 2, rail 50 includes a first end 54 and a second end 56. Rail 50 includes a longitudinal length that is oriented parallel to the first direction or coordinate line 20. In one particular embodiment, rail 50 is formed from a unibody monolithic member. In one specific embodiment, rail 50 may be formed of extruded aluminum that is sufficiently strong yet lightweight and able to be mounted on rail 18 of table saw assembly 12. The rail 50 may be a unibody that is integrally extruded, molded, printed, or additively manufactured, removably machined, or formed as a unitary, monolithic member substantially fabricated from a rigid, manmade, material. In one example, metal or metal alloys, such as stainless steel or aluminum alloy, may form a substantial majority of the components or elements used to fabricate the rail 50 body and the various components integrally formed, molded, or extruded therewith. The rigid rail 50 should withstand typical woodworking handling from an operator pressing the rail 50 against a piece of wood or other woodworking tools without damaging the rail 50. While it is contemplated that the rail 50 and its additional components described herein are uniformly and integrally extruded, molded, or formed, it is entirely possible that the components of the tool body be formed separately from alternative materials as one having routine skill in the art would understand. In another example, the rail 50 may be formed from an elastomeric material or rubber material configured to withstand deformation upon impact or bending by the operator (i.e., a woodworker). Furthermore, while the components of the rail 50 are discussed below individually, it is to be clearly understood that the components and their corresponding reference elements of the rail 50 are portions, regions, or surfaces of the body and all form a respective element or component of the unitary rail 50. Thus, while the components may be discussed individually and identified relative to other elements or components of the rail 50, in this exemplary embodiment, there is a single rail 50 having the below described portions, regions, or surfaces.

Rail 50 defines a first channel that is substantially C-shaped in cross-section extending longitudinally from the first end 54 to the second end 56. First channel 58 is an open channel having an opening that would allow a member or device to be inserted into channel 58 in a direction parallel to the second direction or parallel to coordinate line 22. Rail 50 includes a second channel 60 that is positioned adjacent the first channel 58 and includes an opening that is perpendicular to the opening of first channel 58. Namely, the opening to second channel 60 is along the bottom edge of rail 50 and would allow a member to be inserted into second channel 60 in the vertical direction or direction parallel to coordinate line 24. Rail 50 has additional features herein described.

Fence stop assembly or system 10 additionally includes a plurality of mounting brackets 62 that couple rail 50 to the lower surface 36 of rail 18 on the table saw assembly 12. In one particular embodiment, mounting brackets 62 may be generally elongated S-shaped or Z-shaped including a first planar portion 64 and a second planar portion 66. First planar portion 64 includes an aperture aligned in the vertical direction or parallel to coordinate line 24 that is adapted to receive a screw therethrough to mount the mounting brackets 62 to the rail 18 on the table saw assembly 12. Second planar portion 66 includes at least one aperture but in some embodiments two apertures extending vertically therethrough configured to receive at least one, but in some embodiments two screws therethrough. The apertures 188 formed in second planar portion 66 may be oblong-shaped or rounded-rectangle-shaped to provide bracket 62 to slidably adjust for precision mounting. The length of apertures 188 may be aligned in the second direction or parallel to coordinate line 22. The heads of screw or bolt 68 are configured to engage and be slidably received within second channel 60 in order to mount the rail 50 to the underside of rail 18 by the bolt 68 extending through aperture 188. The head of screw or bolt 68 is received within channel 60 and may be tightened via a threaded nut. For installation of the rail, one bracket 62 may be installed at a time so as to not disrupt the alignment of rail 18 on table saw assembly 12 that will have been previously installed or assembled with the production of table saw assembly 12.

With continued reference to FIG. 2, the exploded perspective view indicates that the first fence stop 52 includes a slide nut 70 that is slidably received within first channel 58 of rail 50. Slide nut 70 includes a threaded aperture to receive a corresponding threaded bolt on first fence stop 52. The threaded aperture 72 allows a bolt of first fence stop 52 to extend in the second direction or parallel to coordinate line 22 through the opening to first channel 58. The slide nut 70 has a size that enables the nut 70 to slide within first channel 58 in a direction parallel to the longitudinal length of rail 50 or parallel to first direction 20 without being pulled out of the channel in a direction parallel to coordinate line 22.

One of the exemplary fence stops is depicted in FIG. 3-FIG. 6. Reference will be made to the elements of the fence stop depicted in FIG. 3-FIG. 6 as portions of the first fence stop 52; however, as mentioned previously, for brevity when shown with a corresponding reference element ending with the capital letter “A”, this will designate the same element on second fence stop 52A.

Fence stop 52 includes a body 74 having a first end 76 and a second end 78. Body 74 is a generally cylindrical member extending from first end 76 to second end 78 but having flat sidewalls and a convex semi cylindrical outer surface between the flat sidewalls. Body 74 includes a first sidewall 80 and a second sidewall 82 diametrically opposite the first sidewall 80. A bore 84 extends transversally through the body 74 from sidewall 80 to sidewall 82. The bore 84 has a countersink 86 formed in the first sidewall 80. The countersink has a diameter greater than that of bore 84. The bore 84 receives a threaded screw 88 therethrough that is configured to threadably mate with the threaded aperture 72 formed in slide nut 70. The countersink 86 receives a collar 90 on a handle 92 that may be rotated about axis 94 to loosen or tighten the relationship between body 74 and slide nut 70.

A threaded aperture 96 is defined in the body and is offset towards the first end 76 from the countersink 86. Aperture 96 is aligned parallel to axis 94 and is in open communication with a smooth bore 98 that is centrally aligned along the length and defines an opening in first end 76. Bore 98 is configured to receive a coupler 230 (FIG. 10) therein and have a set screw 100 engage the coupler 230 (FIG. 10) when threaded into aperture 96.

Body 74 further includes a threaded bore 102 formed in the second end 78 and extending along the central longitudinal axis of body 74. Bore 102 extends centrally within the body 74 and terminates an end that is prior to the transverse bore 84. Stated otherwise, bore 102 is distinct from and not in open communication with bore 84. Similarly, bore 98 is distinct from and not in open communication with transverse bore 84. At least one protrusion or a pair of protrusions 104 extend radially outward from the second surface 82 of body 74 in a direction parallel to axis 94. Protrusions 104 include chamfered walls 106 along the longitudinal edges thereof. In one particular embodiment, body 74 is a unibody monolithic member formed from a rigid material capable of withstanding typical woodworking forces. Some exemplary materials are aluminum or stainless steel.

With continued reference to FIG. 3-FIG. 6, the fence stop 52 additionally includes a lever 108 having a unique configuration. Lever 108 includes a first end 110 opposite a second end 112. The first and second ends 110, 112 are spaced apart from each other. A first surface 114 and a second surface 116 are offset parallel to each other and extend between the first and second ends 110, 112. A sidewall defining a thickness of the lever 108 extends between the first surface 114 and the second surface 116. The sidewall 118 is a continuous sidewall that is largely uninterrupted but has a unique configuration. Sidewall 118 includes a first portion 120 defining the first end 110 that is convex and extends between the first surface 114 and the second surface 116. The lever 108 includes a second portion 122 of sidewall 118 that extends from the portion 120 towards the second end 112 and is largely offset parallel to the central axis 144 of the fence stop 52. From portion 122, a concavely-curved portion 124 flares radially outward to a protrusion 126 that defines a surface or portion of a surface of sidewall 118 that is configured to act as a bump stop for the lever when it is pivoted about an axis of the fence stop 52, as described in greater detail herein. From the protrusion 126, a second concave surface 128 extends towards the second end 112 that is defined by a convexly-curved portion 130.

Lever 108 defines a central opening 132 that extends entirely through the lever 108 from the first surface 114 to the second surface 116. The central opening 132 is generally a rounded triangular configuration in cross section; however, other shapes of the central aperture are entirely possible. The central aperture configuration in one embodiment may complement or otherwise be similar to that of the outer profile or parameter edge of lever 108. Thus, with the protrusion 126 extending radially outward from the central axis of the central aperture 132, this causes the central aperture 132 to have a portion of the opening that extends radially outward from the central axis in a manner similar to that of protrusion 126.

Figure 6:
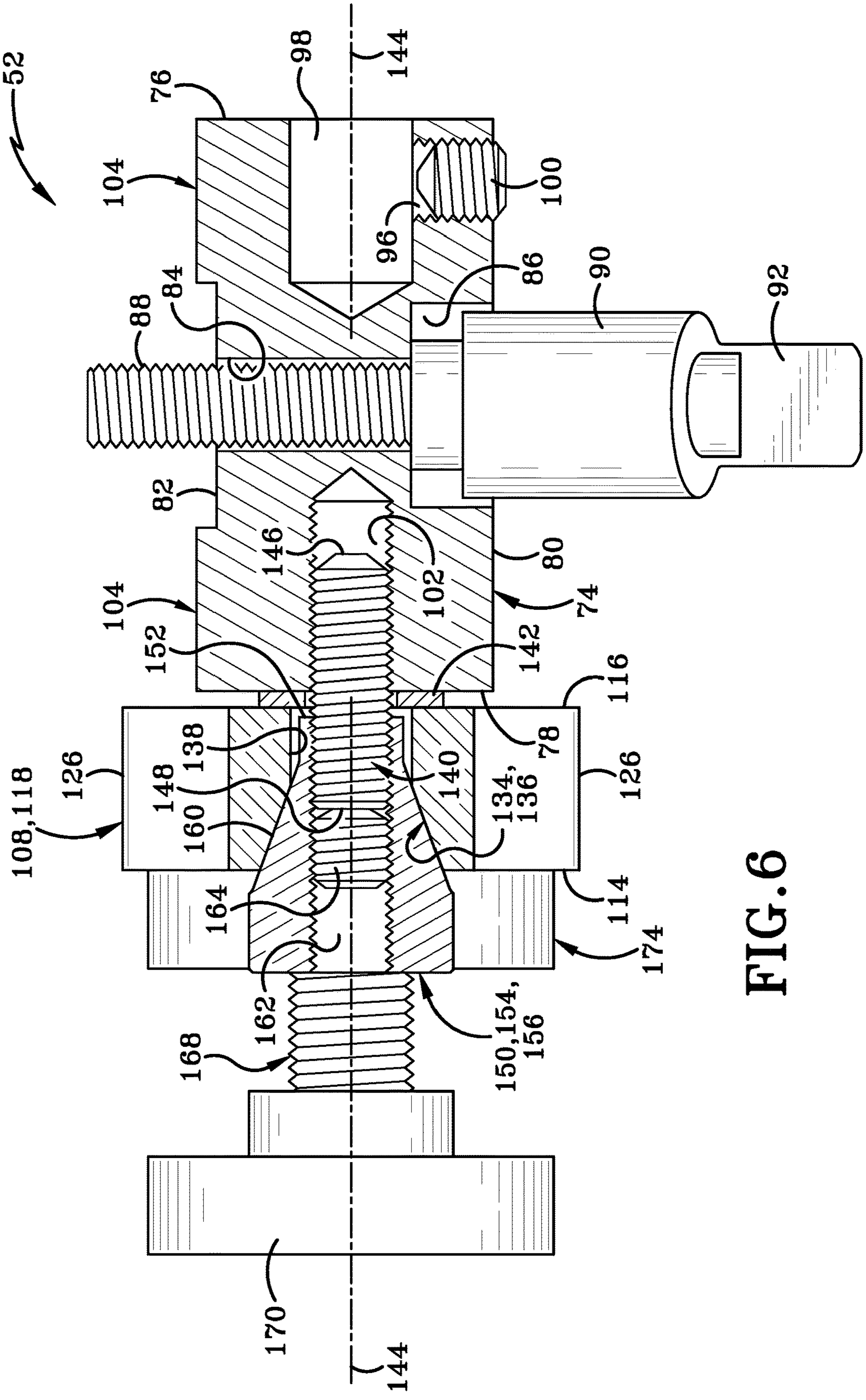
FIG. 6 is a longitudinal cross section view of the exemplary fence stop taken along line 6-6 in FIG. 3.

Lever 108 additionally includes a tapered bore 134 that extends from the first surface 114 to the second surface 116. More particularly, the tapered bore 134 includes an outer diameter at the first surface 114 that is larger than the diameter of the opening of the bore 134 at the second surface 116. Stated otherwise, a tapered sidewall 136 extends from the first surface 114 towards the second surface 116. In one particular embodiment, the tapered sidewall 136 may extend entirely from the first surface 114 to the second surface 116. In a particular embodiment, as shown in FIG. 6, the tapered sidewall 136 extends from the first surface 114 towards a middle portion of the lever 108 where the bore stops tapering and then is a uniform bore defined by an inner sidewall 138. Tapered bore 134 is configured to receive a bolt or screw 140 therethrough such that the bolt or screw 140 is threadably received within the threaded bore 102 on the body 74. As shown in FIG. 6, the threaded bolt or screw 140 threads into the threaded bore 102 and couples the lever 108 to the body 74 such that the second end 78 of the body 74 is closely adjacent the second surface 116 of the lever 108. The body 74 and the lever 108 may be spaced via a washer 142 that will provide a clearance or a gap between second surface 116 and second end 78 to allow the lever to rotate and pivot about the central axis 144 of the fence stop 52.

The bolt or screw 140 includes a first end 146 and a second end 148. The second end 148 may be formed and define an Allen key receptacle such that the flights of the screw 140 extend fully from the first end 146 to the second end 148. As will be described in greater detail herein, the second end 148 is configured to receive thereon a complementary threaded portion of a tapered nut 150.

With continued reference to FIG. 3-FIG. 6, the tapered nut 150 includes a first end 152 opposite a second end 154. The second end 154 defines an annular surface 156. Near the second end 154 is a hex nut configuration of a sidewall. From the hex nut sidewall 158, there is a tapered sidewall 160 that tapers from the hex nut 158 towards the first end 152. A threaded bore extends centrally through the tapered nut 150 such that the tapered bore 162 threadably receives the second end 148 of bolt or screw 140. The threaded bore 162 extending fully through the tapered nut 150 allows a set screw 164 to be threaded into the threaded bore 162 of the tapered nut 150. The set screw 164 holds the bolt or screw 140 in place that allows the tapered nut 150 to reside within the tapered bore 134 of lever 108. As will be described in greater detail below, when the lever 108 is pivoted about axis 144, the lever may rotate such that the tapered sidewall 136 of the lever 108 engages the tapered sidewall 160 of the tapered nut 150 allowing the pivoting action about axis 144 to occur.

The lever 108 defines a threaded bore 166 that is configured to receive an adjustment screw 168. The adjustment screw 168 is one exemplary embodiment of a micro adjustment mechanism or device that enables the fence stop 52 to impart micro adjustments to move the sidewall 28 of the fence 16 to a desired location along the length of rail 18 shown in FIG. 1. Particularly, one exemplary embodiment of the micro adjustment mechanism or device is screw 168 having a thumbwheel 170 and a threaded screw terminating in a stop surface 172. The stop surface 172 is a generally planar surface perpendicularly-oriented relative to central axis 144. As will be described in greater detail herein, the stop surface 172 moves between a first position and a second position. In one particular example, the stop surface 172 is configured to revolve around axis 144 such that it moves between various positions configured to engage or not engage a portion of the fence assembly 16 or table saw fence 16 depending on the desired or selected position of the fence stop 52 based on user preference. Stated otherwise, the stop surface 172 can revolve about axis 144 as lever 108 pivots about axis 144 from an engaged and stopping position (i.e., the second position) to a disengaged or non-stopping position (i.e., the first position). When the stop surface 172 is moved via the lever 108 pivoting to the stopped position, the table saw fence or a portion thereof engages or touches the stop surface 172. When the stop surface 172 carried by lever 108 is in the lowered or disengaged or non-stopping position or first position, then the table saw fence 16 or fence assembly may easily pass over the entire fence stop 52 so as to enable the fence assembly to selectively slide along the length of rail 18 to a desired location selected by user preference.

A lock wheel 174 is operatively connected with the micro adjustment mechanism. In one embodiment, the lock wheel 174 is an annual member defining a threaded bore 176 that is positioned between the first surface 114 of lever 108 and the thumbwheel 170. The lock wheel 174 may be threadably turned along the length of the micro adjustment screw 168 in order to lock the stop surface 172 in a desired position. Particularly, the lock wheel 174 may be rotated to engage the first surface 114 of the lever 108 to effectively lock the stop surface at a desired location. If the stop surface 172 needs to be moved, the lock wheel 174 may be rotated to disengage the lock wheel 174 from the surface 114 on the lever which will thereby allow the thumbwheel 170 to be turned to move the position of the stop surface 172 relative to second surface 116 of lever 108.

Figure 7A:
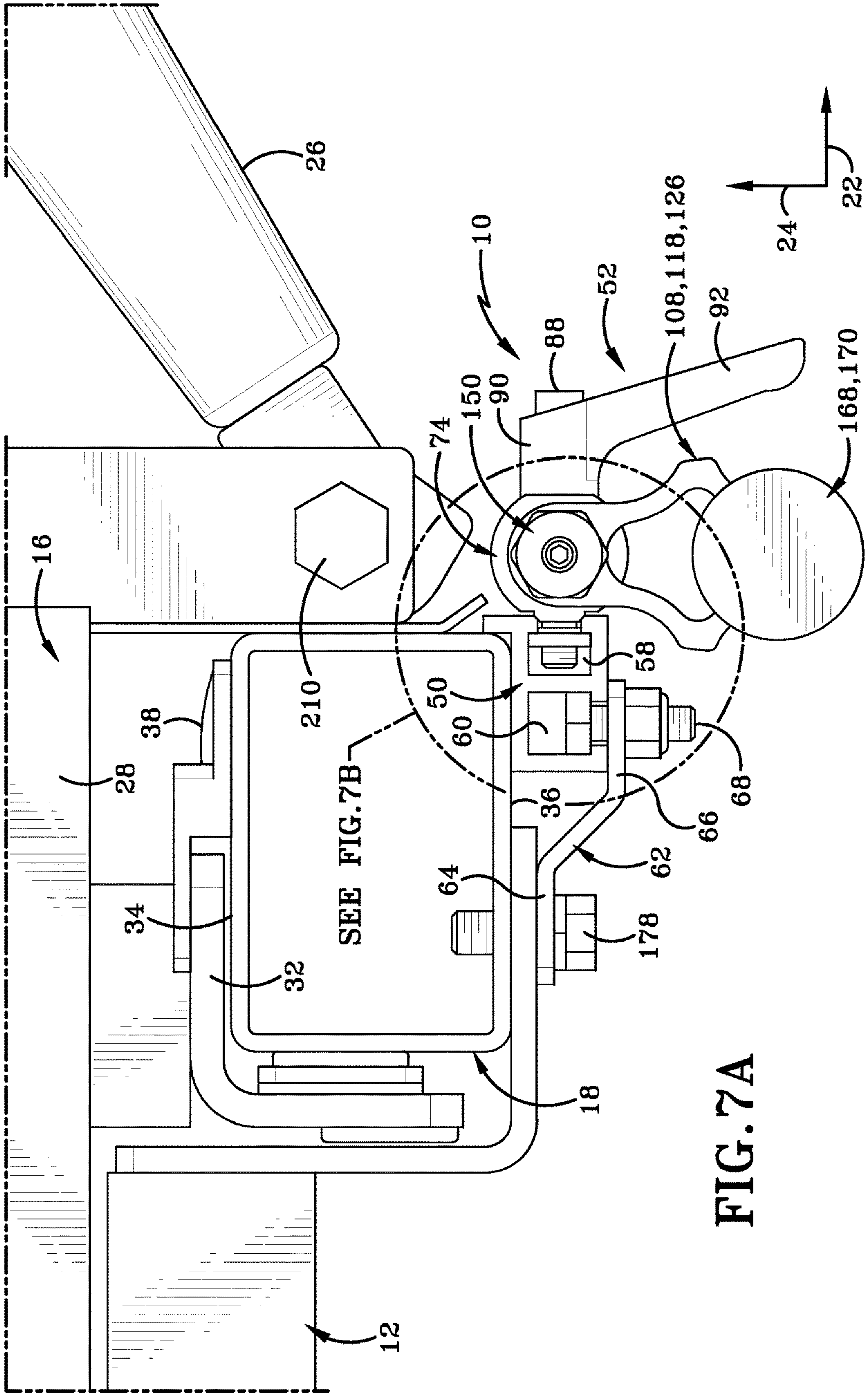
FIG. 7A is an end elevation view of the fence stop system mounted to a table saw according to one embodiment of the present disclosure.
Figure 7B:
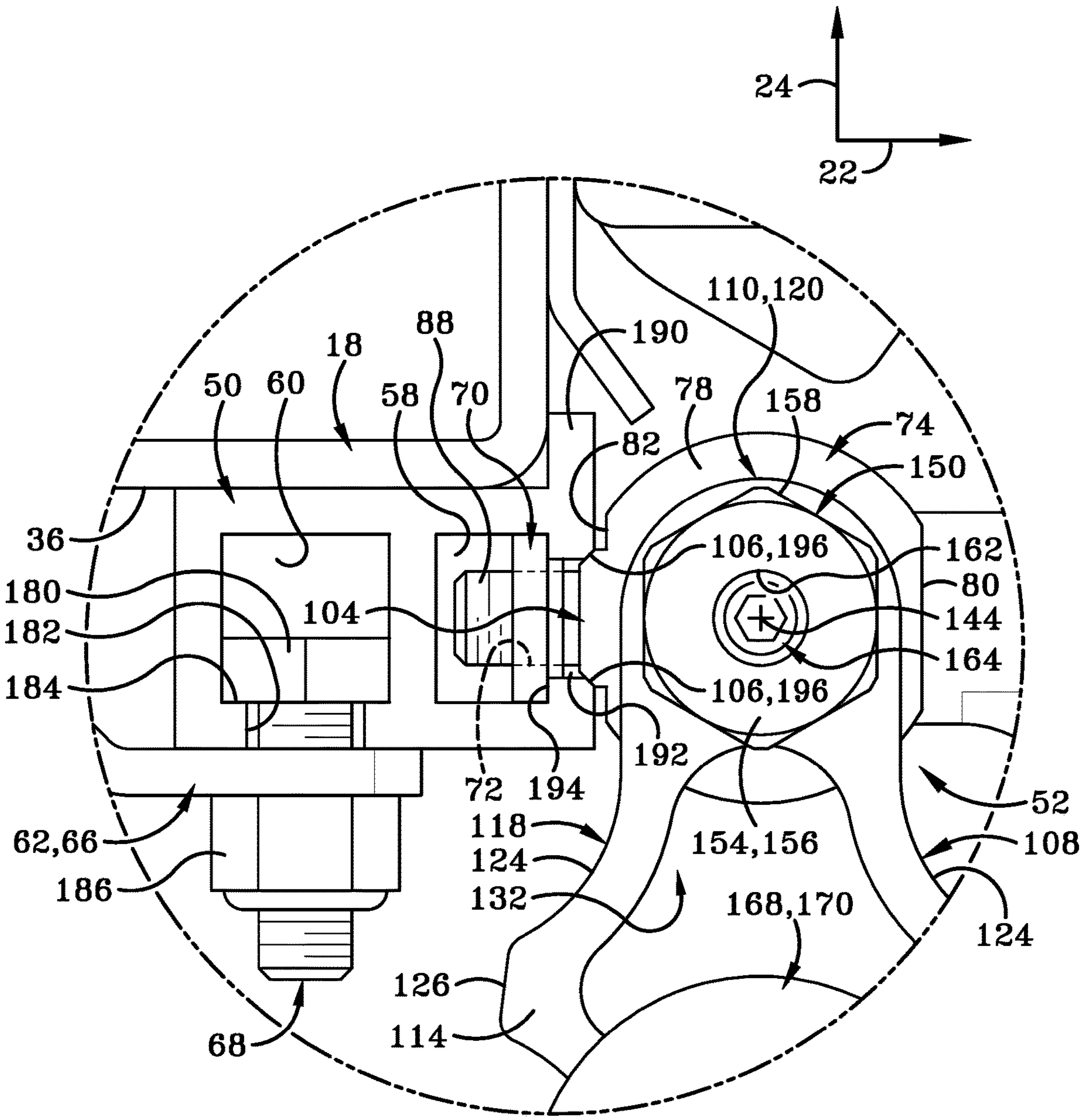
FIG. 7B is an enlarged end elevation view of the region labeled "SEE FIG. 7B" in FIG. 7A.
Figure 7C:
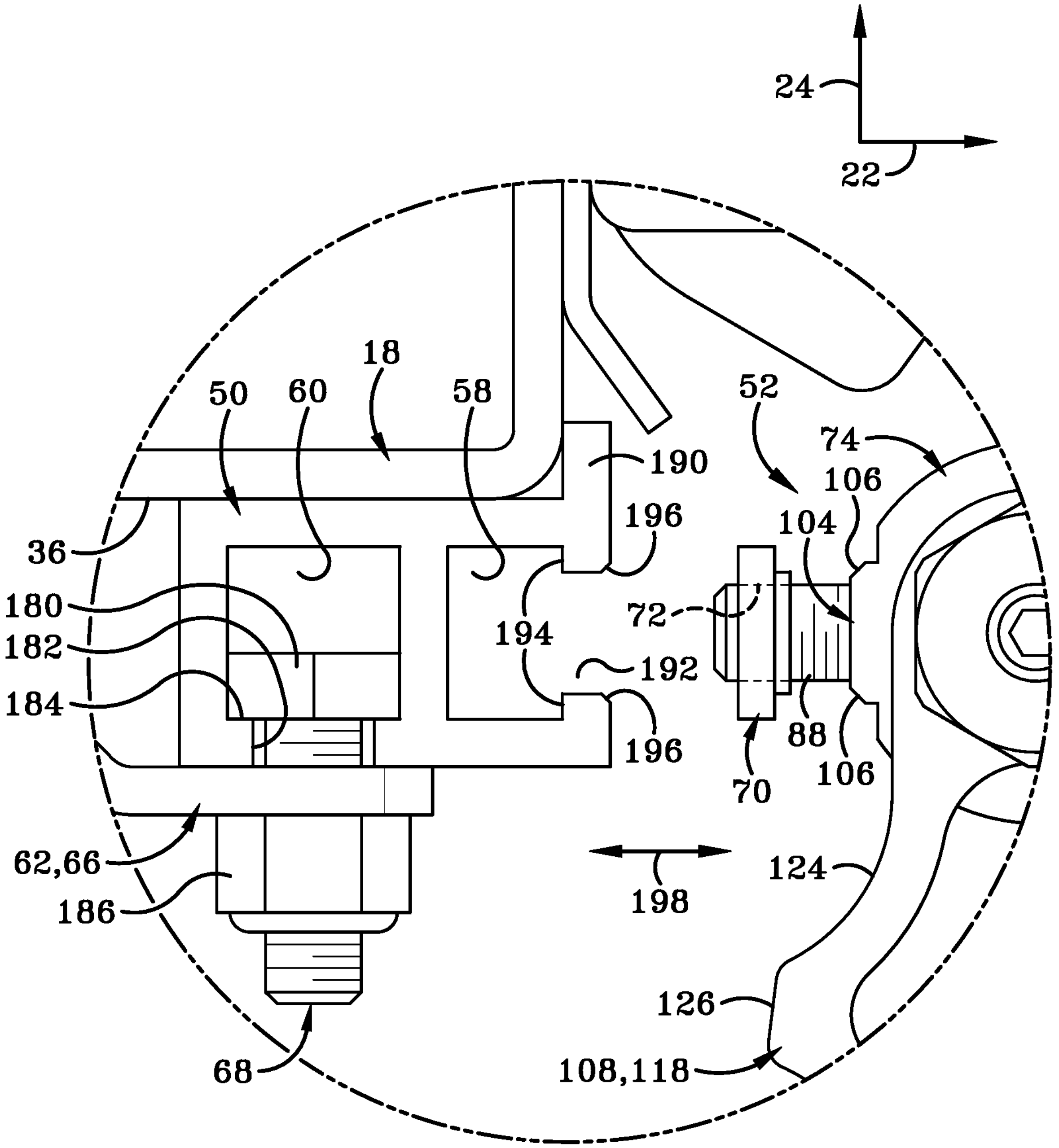
FIG. 7C is an enlarged operational end elevation view of the region from FIG. 7B depicting the fence stop removed from the rail.

FIG. 7A and FIG. 7B depict a cross section view of the fence stop 52 installed on rail 50 of the fence stop assembly system 10. FIG. 7C depicts the removal of the fence stop 52 from the rail 50.

FIG. 7A depicts a single bolt 178 used to mount the first portion 64 of mounting bracket 62 to the lower surface 36 of rail 18. Bolt 178 may be installed from the bottom such that the head of bolt 178 is positioned below the lower surface 36 of rail 18. The second portion 66 of bracket 62 is positioned lower than the first portion 64. Bolt 68 is used to install the rail 50 above the second portion 66 of bracket 62 and below the lower surface 36 of rail 18. Stated otherwise, in this particular example, rail 18 is configured to mount between bracket 62 and the lower surface 36 of rail 18. However, it is understood that other configurations are possible.

FIG. 7B depicts that bolt 68 includes a head 180 that is disposed within the second channel 60. Head 180 has a width or diameter that is complementary or approximates the maximum dimension of the second channel 60 measured in the second direction parallel to coordinate line 22. This ensures a tight fight of the head 180 within the second channel 60. The bolt 68 extends downwardly through the opening 182 that has a narrower dimension than that of the primary portion of second channel 60. This creates a ledge 184 for the head 180 of bolt 68 to abut. Bolt 68 may be tightened with a nut 186 to mount the rail 50 to the rail 18. The second portion 66 of mounting bracket 62 may be formed with a plurality of oval or oblong apertures 188 that allow for slight transverse adjustment in the second direction or in the direction parallel to coordinate line 22 when mounting the rail 50 to the rail 18. The rail 50 includes an upper extension 190 that abuts the frontal sidewall of the rail 18 to limit the maximum amount of travel of the rail 50 in the second direction or in the direction parallel to coordinate line 22.

With continued reference to FIG. 7B, the fence stop 52 is coupled to the rail 50 by inserting the slide nut 70 into the first channel 58 such that the height of the slide nut 70, which is oriented parallel to the coordinate line 24, is aligned with the maximum vertical dimension of the first rail 18. The height of the slide nut 70 is greater than the dimension of the opening 192 to the first channel 58. This creates a ledge 194 for the slide nut 70 to engage the ledge 194 to retain the fence stop in a desired position along the length of the rail 50. When the slide nut 70 engages ledge 194, a boss or collar of slide nut 70 is disposed within the opening 192 to channel 58, wherein boss or collar defines a portion of threaded aperture 72. Additionally, a portion of the wall of the rail that defines the opening 192 to channel 58 is chamfered or has a chamfered edge 196 that is complementary to the chamfered edge 106 on the protrusion 104 from body 74 of the fence stop 52. The chamfered edge 106 and the chamfered edge 196 align and contact each other when the screw 88 is mounted and tightened onto slide nut 70. The chamfered edges 106, 196 align to ensure proper vertical alignment in a direction parallel to coordinate line 24 and ensure that the fence stop 52 is aligned in both the first direction and the second direction.

FIG. 7C depicts the removal of the fence stop 52 from the rail 50. The screw 88 may be loosened so as to disconnect the slide nut 70 from its engagement with ledge 194. This will allow the slide nut 70 and the fence stop 52 to slide within the channel 58 along the longitudinal length of the rail that is oriented in the first direction parallel to coordinate line 20. Stated otherwise, prior to complete removal from the rail 50, the fence stop 52 may be loosened to slide along the length of the channel 58 of rail 50 to selectively position the fence stop 52 at any desired length. As will be described in greater detail below, it is typical for table saws, such as table saw assembly 12, to need common dimensions when cutting wood having standard sizes. For example, when a wood worker is making cabinets, often many of the cabinets have the same dimensions in a certain direction. As such, the fence stop 52 may be slid to a desired location corresponding to a certain dimension offset 30 of the fence wall 28 relative to blade 14 and locked into that position by tightening the screw 88 to engage the slide nut 70 as shown in the locked position of FIG. 7A and FIG. 7B. However, in the event the woodworker wants to remove the fence stop, the slide nut may be loosened by rotating screw 88 in a counterclockwise direction about its axis and the slide nut may be moved out of the channel 58 such that the fence stop may be removed from the rail and pulled away in the direction indicated by arrow 198.

Collectively, FIG. 8A-FIG. 12C generally depict a variety of the operations and methods/processes of the fence stop system 10 for table saw assembly 12.

Figure 8A:
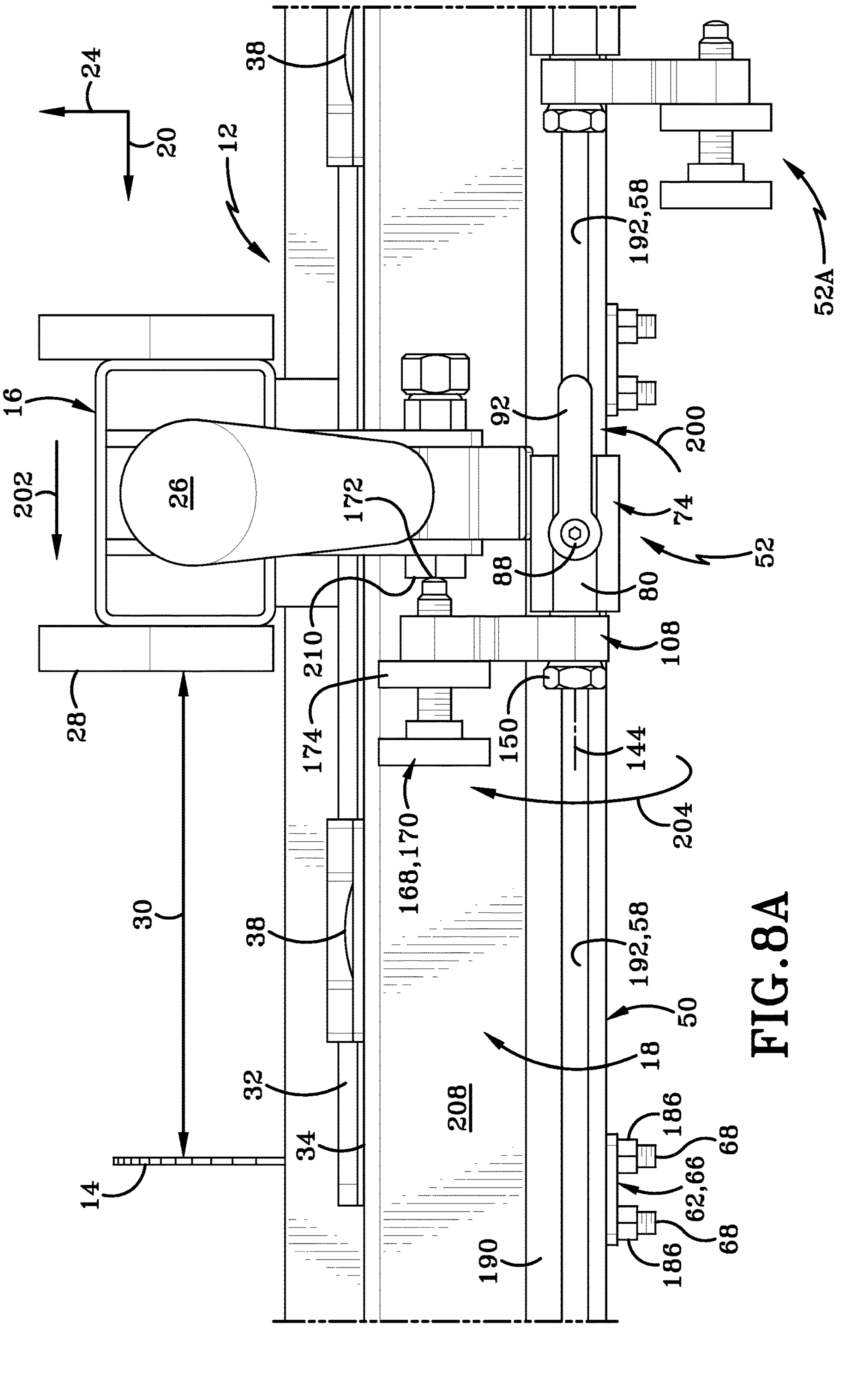
FIG. 8A is an operational front side elevation view of the fence stop depicting the stop surface having been raised from its lowered first position to a raised second position.

FIG. 8A depicts the beginning operation for a user to set a desired offset distance 30 for the sidewall 28 of fence 16 relative to blade 14 on table saw assembly 12. After the fence stop 52 is installed on the rail 50, the user may loosen the handle 92 as indicated by arrow 200. Loosening of the handle 92 disengages or loosens the grip of the slide nut 70 in the first channel 58 so that the fence stop 52 may slide along the rail to a user selected distance. The sliding of the fence stop 52 may occur independently or it may occur in unison with the movement of the fence 16 as indicated by arrow 202. When moved in unison in the direction of arrow 202, the lever 108 should be rotated and pivoted upwardly above the rail 50 about axis 44 as indicated by arrow 204. The fence stop 52 slides along the length of the rail in a direction parallel to dimension line 20. When sliding in unison, the stop surface 172 engages the stop block 210. More particularly, force may be imparted from the table saw fence 16 through the stop block 210 through the stop surface 172 to effectuate linear movement or linear translation of the first fence stop 52.

Figure 8B:
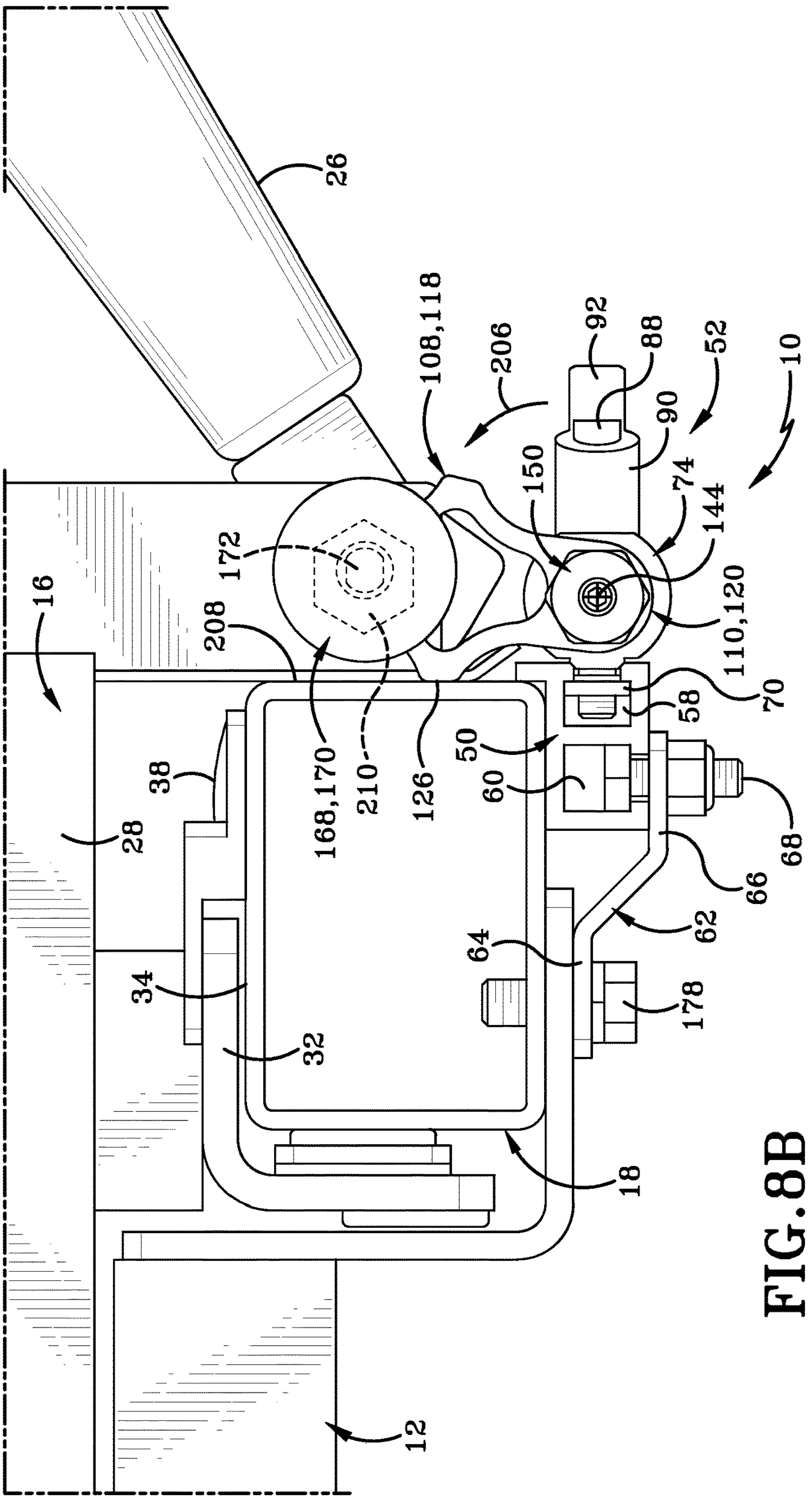
FIG. 8B is an operational end elevation view of the fence stop depicting the stop surface in its raised second position.

FIG. 8B depicts the pivoting movement of the lever 108 about axis 144 as indicated by arrow 206. When the lever 108 is pivoted upwardly, the stop surface 172 is positioned above the rail 50. More particularly, stop surface 172 is positioned above the first channel 58 and above the second channel 60. When in this raised position, the stop surface 172 is above the lower surface 36 of the rail 18 on table saw assembly 12 but below upper surface 34 of rail 18. However, it is entirely possible that the stop surface 172 could be positioned above the upper surface 34 of rail 18. When the lever 108 and stop surface 172 are in the raised and stopping position (i.e., the second positon of stop surface 172), the portion 126 of lever 108 engages the frontal surface 208 of rail 18. Surface 126 engages the frontal surface 208 to prevent over rotation of the lever about axis 144. By engaging the portion 126 of the lever 108 with the frontal surface 208, the stop surface 172 is aligned with a portion of the table fence assembly 16. In one particular embodiment, the stop surface 172 is moved to its second positon and aligned with a nut or the head of a bolt 210 that causes the fence or a portion of the fence to be stopped in a desired position by the fence stop 52. While the bolt head 210 is a shown embodiment, any surface acting as a stop block to engage the stop surface 172 may be utilized. Thus, bolt head 210 may also be referred to herein as stop block 210. It will be understood that the indicia on the upper surface 34 are to be calibrated based on the size of the bolt head 210 or associated stop block to ensure that the stop surface 172 engages the portion of the fence to offset the distance 30 the appropriate amount based on the dimensions of the components used herein.

Figure 8C:
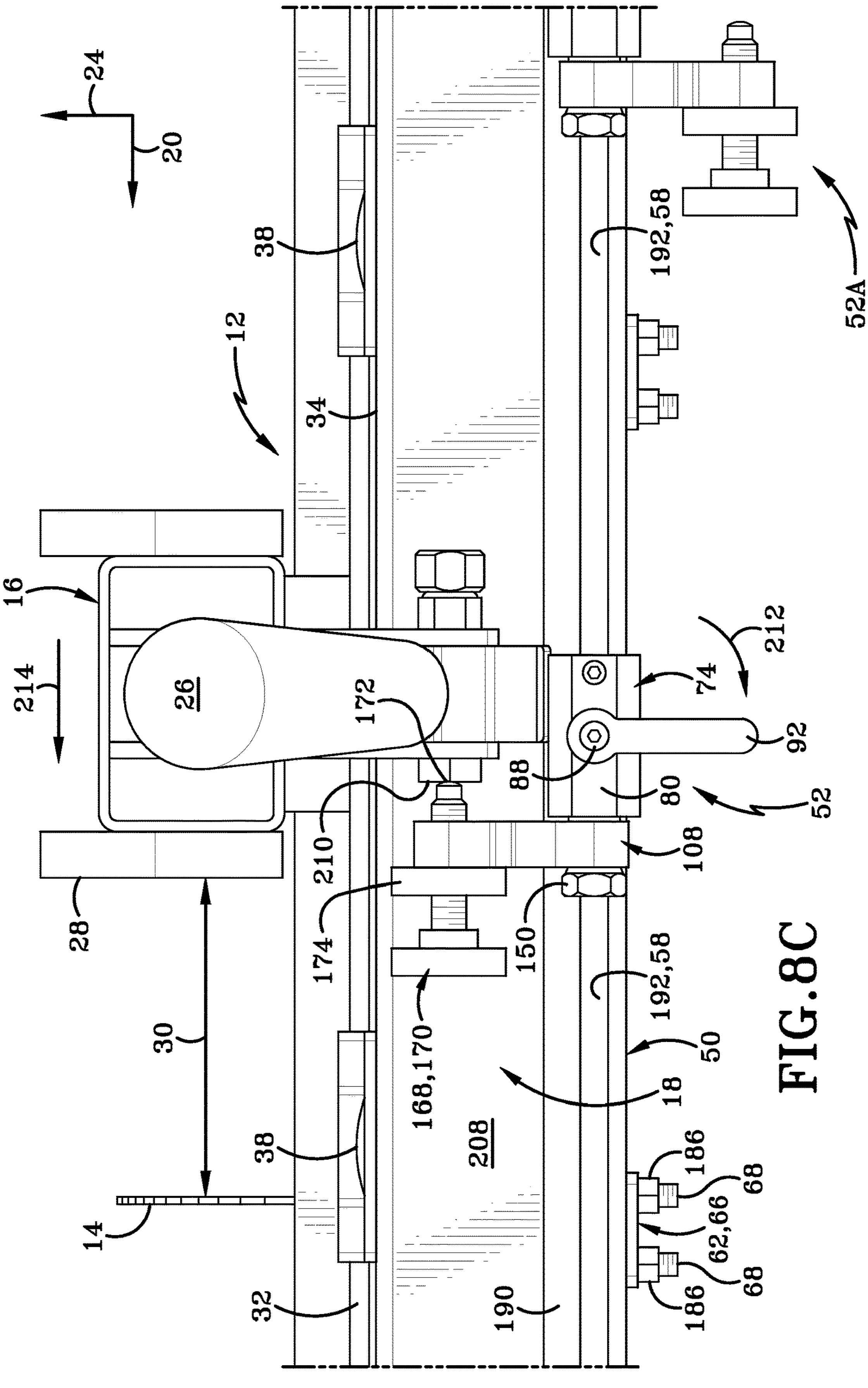
FIG. 8C is an operational front side elevation view of the fence stop depicting the fence stop being locked into position and engaging the fence with the fence stop.

FIG. 8C depicts locking the fence stop 52 into a set and selected position based on a desired offset distance 30. To lock the fence stop 52 at the user-selected and desired position, an operator will rotate handle 92 in a clockwise direction as indicated by arrow 212. This will lock the body 74 to the rail 50. When the body 74 of fence stop 52 is locked to the rail, the lever 108 can be pivoted and between the lowered position and the raised position. When in the raised position, as shown in FIG. 8C, the fence assembly 16 may be moved in the direction indicated by arrow 214 so that the bolt head 210 or stop block abuts the stop surface 172 to provide a desired offset distance 30.

Figure 8D:
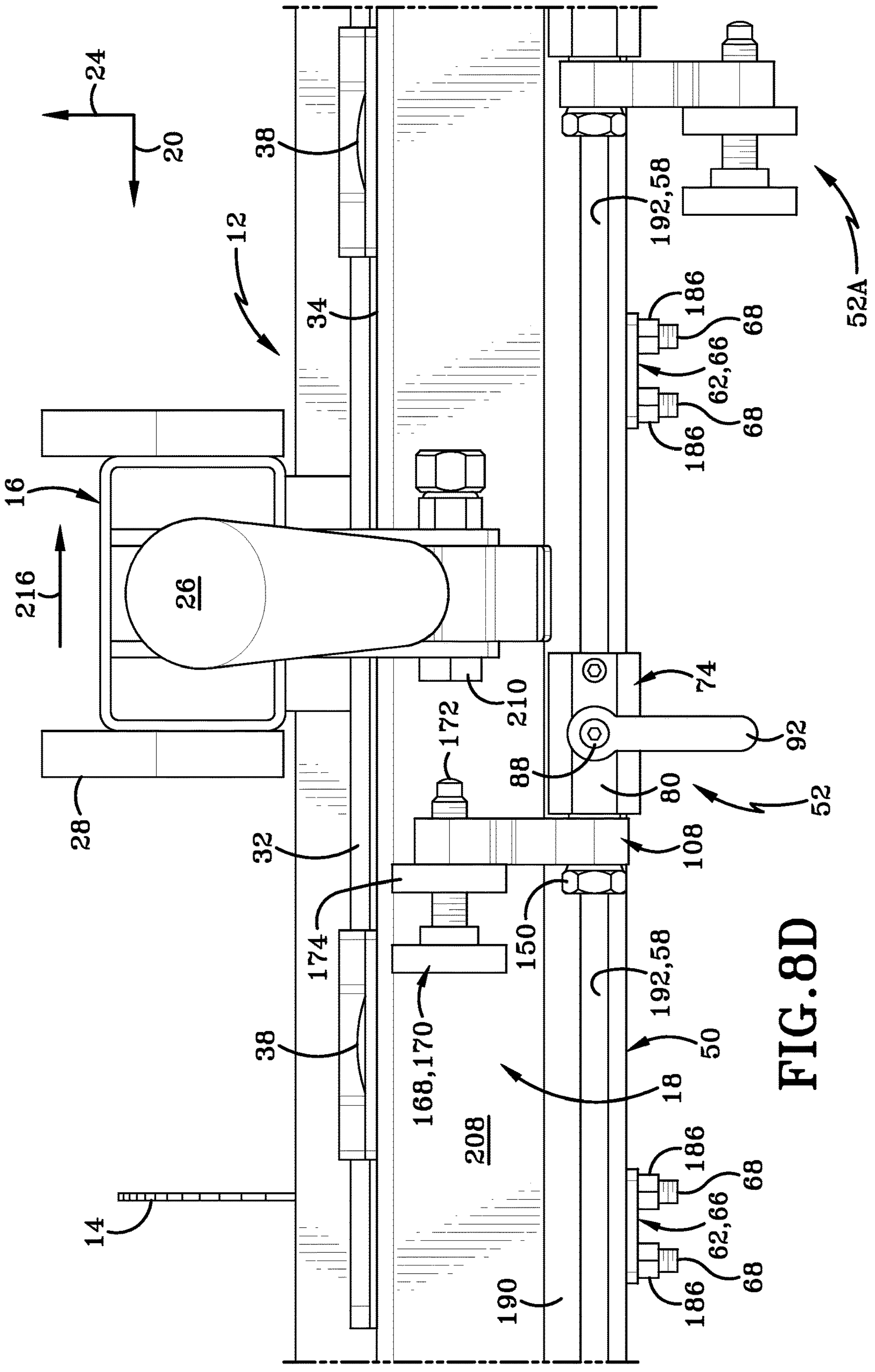
FIG. 8D is an operational front side elevation view of the fence stop depicting the fence being move laterally from the fence stop.
Figure 8E:
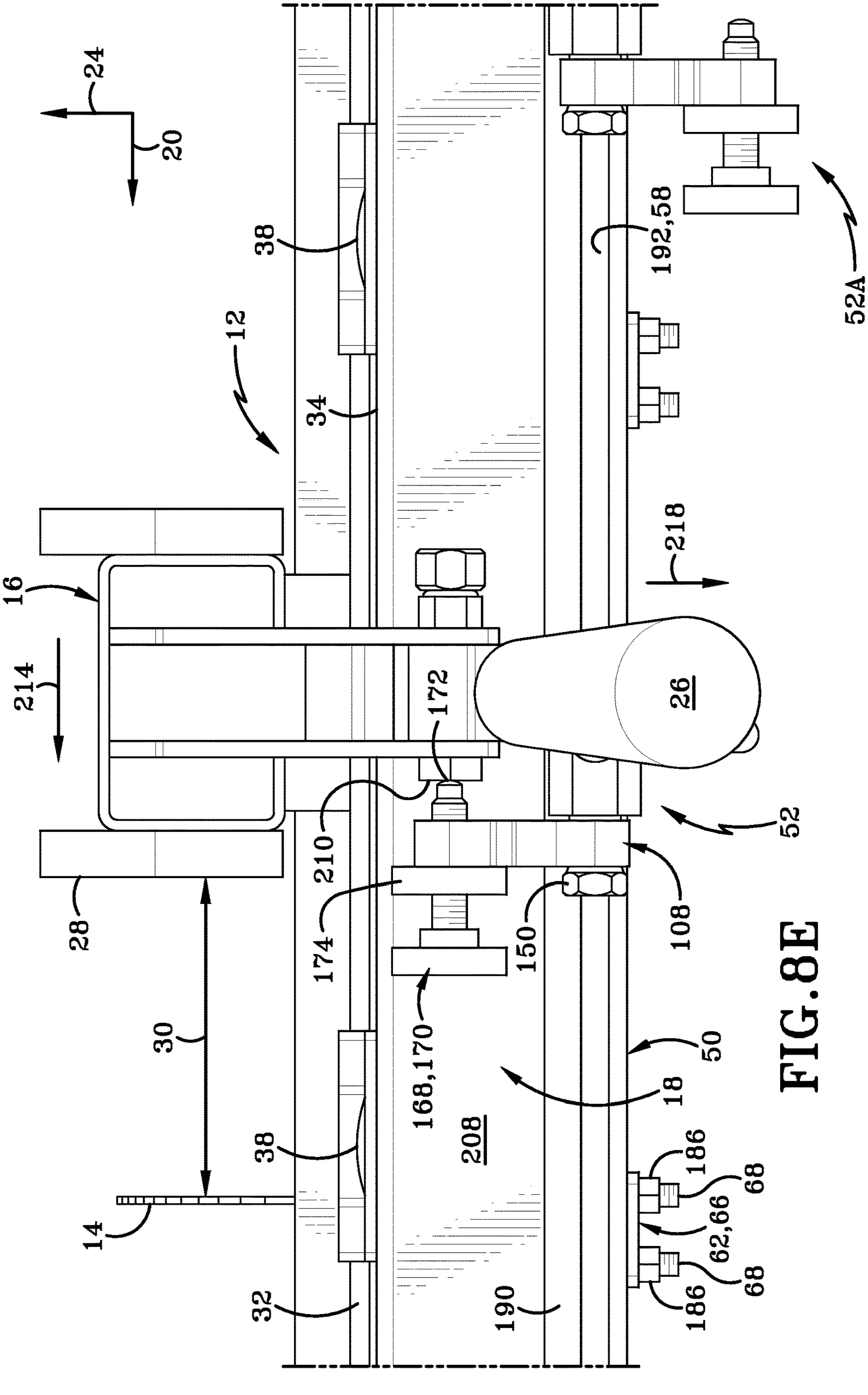
FIG. 8E is an operational front side elevation view of the fence stop depicting the fence engaging the fence stop and being locked at a desired location.

FIG. 8D depicts that the fence is able to be moved slightly to be adjusted if needed, as indicated in arrow 216. If adjustment in the direction of arrow 216 is not needed, then, as shown in FIG. 8E, the fence 16 may be moved and returned to abut the stop block 52 by engaging bolt head 210 with stop surface 172 by moving the fence 16 in the direction of arrow 214 and then locking the fence 16 in place by rotating the locking handle 26 downwardly in the direction of arrow 218.

Figure 8F:
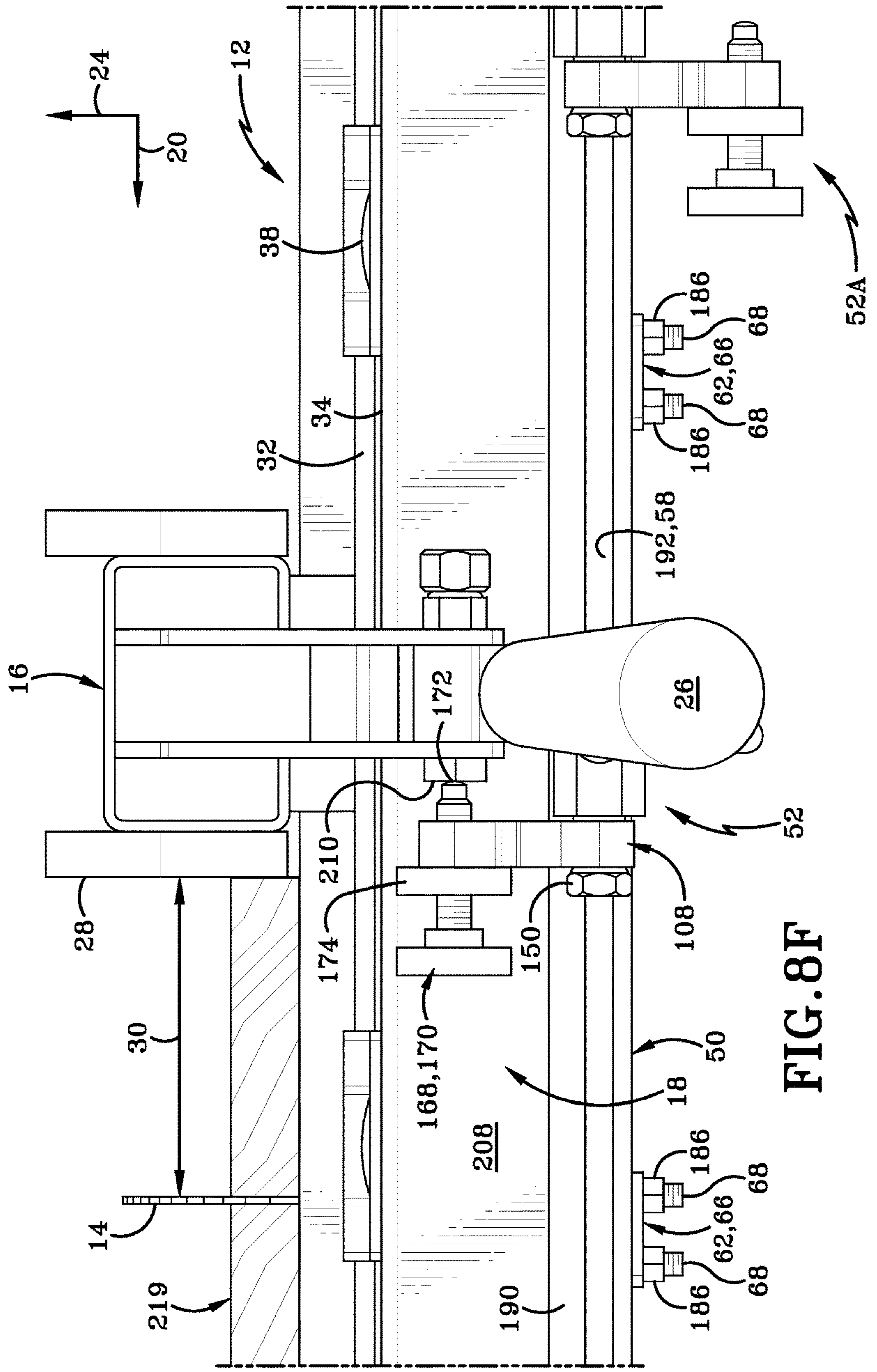
FIG. 8F is an operational front side elevation view of the fence stop depicting a piece of wood or board being rip cut at a desired offset distance based on the location of the fence stop.

FIG. 8F depicts that when the fence is locked into a position, a piece of wood 219 may be ripped or cut via saw 14 to provide a desired cut dimension defined by the offset distance 30. While the cutting action is occurring, the stop surface 172 engages the bolt head 210 or the stop block of the fence 16.

Figure 9A:
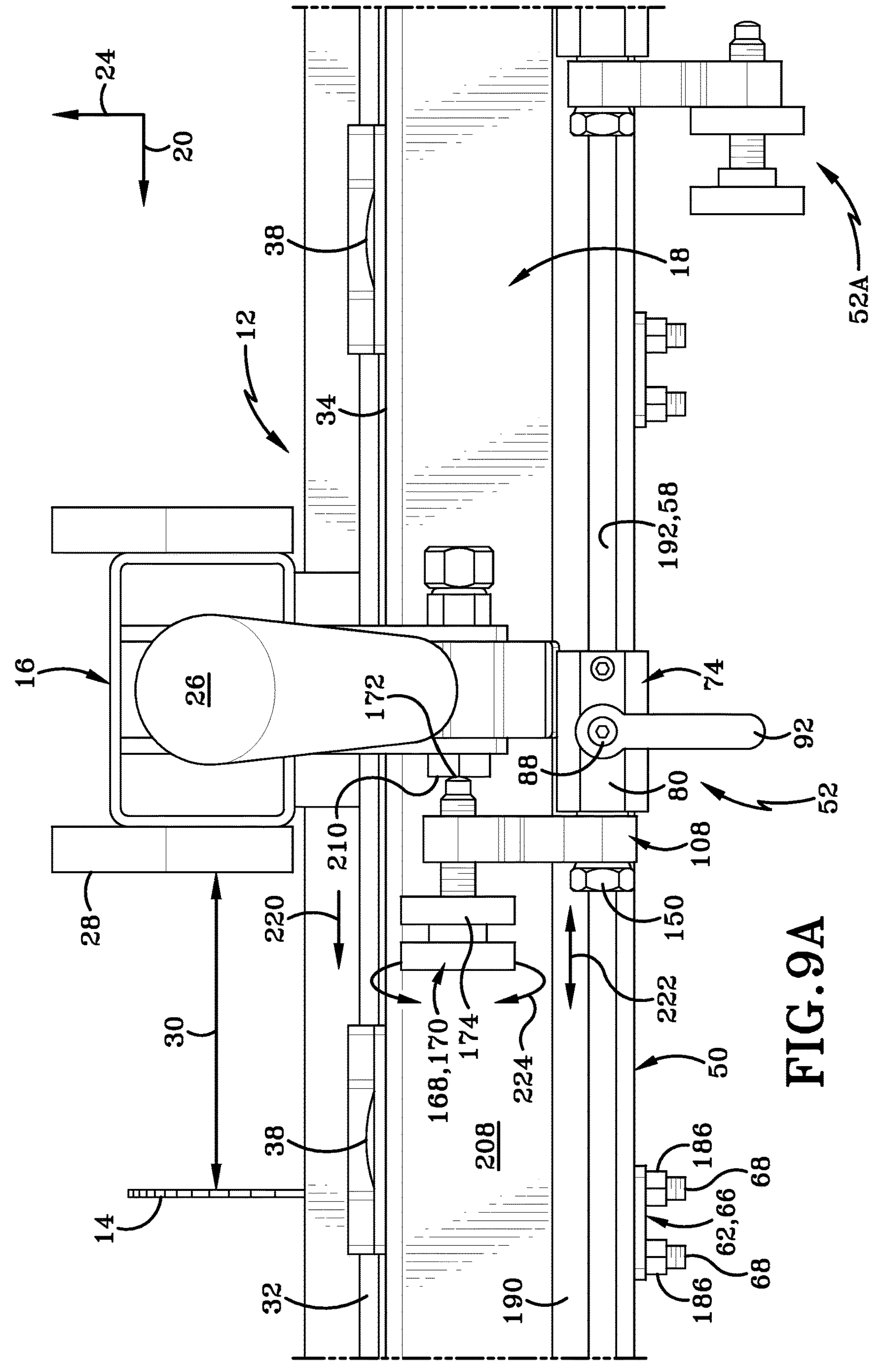
FIG. 9A is an operational front side elevation view of the fence stop depicting a micro adjustment lock wheel having been loosened so that a micro adjustment can be made via rotational action of a micro adjustment mechanism or screw.
Figure 9B:
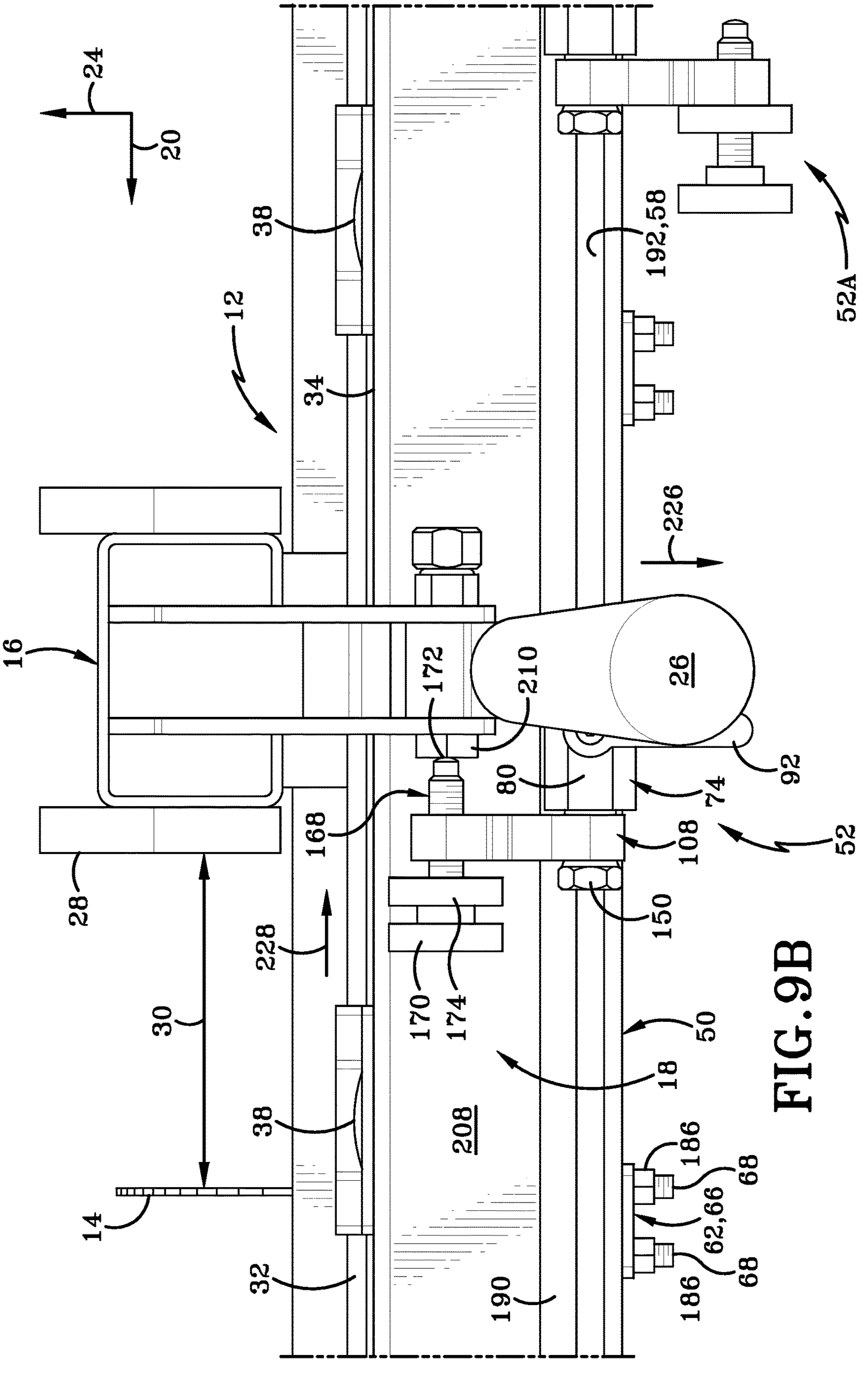
FIG. 9B is an operational front side elevation view of the fence stop depicting locking the fence at a desired location after having performed a micro adjustment via rotational action of the micro adjustment screw.
Figure 9C:
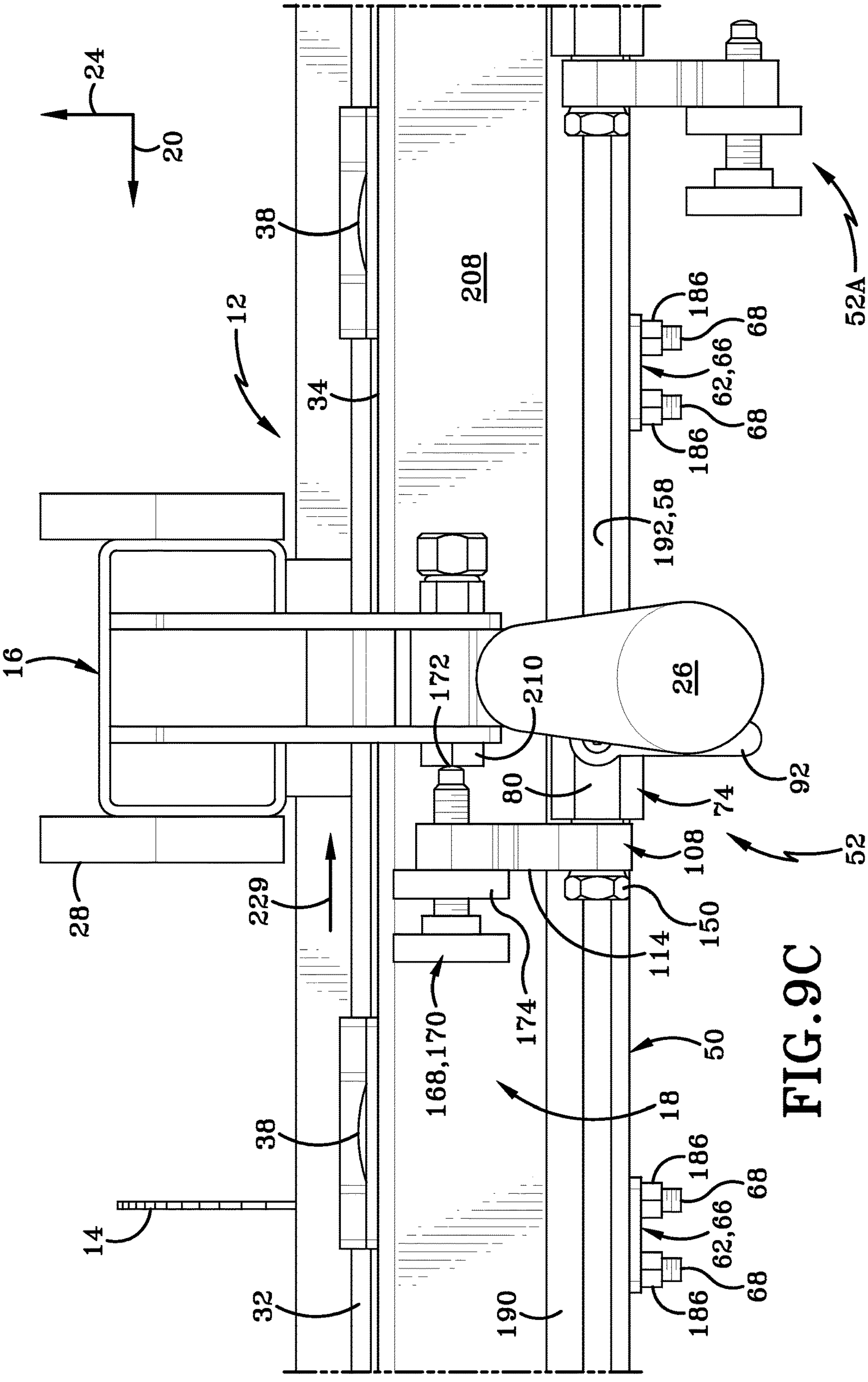
FIG. 9C is an operational front side elevation view of the fence stop depicting locking the lock wheel on the micro adjustment screw.

FIG. 9A-FIG. 9C depict the ability to perform micro adjustments while the fence stop 52 is in the raised blocking position. In operation and with reference to FIG. 9A-FIG. 9C, the fence stop system 10 installed on the table saw assembly 12 can be used for micro adjustments in conjunction with the alignment of the fence and sidewall 28 of fence 16 to align the viewport 38 over a desired indicia location on the top surface 34 of rail 18 to provide a desired offset distance 30 from the blade relative to the sidewall 28.

FIG. 9A depicts that the lever 108 carrying the stop surface 172 is in the raised position above rail 50 to position the stop surface in its second position. The handle 92 of fence stop 52 is in the locked position such that the body 74 does not move relative to the rail 50. The stop surface 172 is positioned above the rail 50 in its second positon having been moved from its first position below the rail 50. The lock wheel 174 has been threadably moved along the length of micro adjustment screw or mechanism 168 to the left or towards the second end of rail 50 as indicated by arrow 220. The rotation of lock wheel 174 allows micro adjustments to occur. Particularly, when the lock wheel 174 is disengaged from the first surface 114 of lever 108, the lock wheel is effectively in the unlocked position when not engaging first surface 114 as shown in FIG. 9A. This allows a user to rotate the thumbwheel 170 operatively connected to the micro adjustment mechanism or screw 168 to move the stop surface 172 at a fine or relatively small amounts or increments in the first direction parallel to coordinate line 20. The micro adjustment of stop surface 172 can occur in either direction as indicated by arrow 222 in response to rotation of thumbwheel 170, wherein the rotation of thumbwheel 170 is indicated by arrow 224. Thus, the operative association is one of rotation-to-translation. Namely, rotational action of one portion of the micro adjustment mechanism effectuates linear translation of another portion of the micro adjustment mechanism or stop surface 172.

FIG. 9B depicts that the rotation of thumbwheel, shown by arrow 22 in FIG. 9A, causes the micro adjustment to move stop surface 172 slightly to the right as indicated by arrow 228. However, the micro adjustment may also be towards the left. Regardless, the micro adjustment may occur as a slight linear translation in either way parallel to coordinate line 20. Once the micro adjustment has occurred, the lock handle 26 of the table saw assembly 12 may be locked into place by moving handle 26 downwardly as indicated by arrow 226 in a direction parallel to coordinate line 24. This locks the table saw fence 16 at the desired offset 30 that was micro adjusted in FIGS. 9A-9B.

As shown in FIG. 9C, the stop surface 172 may be then locked into a position by threading the lock wheel 174 along the length of the micro adjustment mechanism or screw 168 in a direction to the right as indicated by arrow 229 to move the lock wheel 174 from its unlocked position shown in FIGS. 9A-9B to its locked position shown in FIG. 9C in which the lock wheel 174 engages the first surface 114 of lever 108 to threadably lock the stop surface 172 at a desired position relative to rail 18. After the lock wheel 174 has been moved to the right in the direction shown in 229 and the lock wheel locks the micro adjustment screw 168 in a desired position, the stop surface 172 engages the corresponding or complementary bolt head 210 or stop block 210 on the fence 16 or fence assembly 16. This ensures the desired offset distance 30 and is confirmed by the operator by viewing through the viewport 38 to identify indicia on the top surface of the rail 18.

Typically, the fence stop 52 is left in place at a desired distance or dimension along the rail at which the fence, or more particularly the sidewall 28 of fence 16, needs to be positioned so that an operator of the table saw assembly 12 can make a plurality of ripping cuts all needing the same dimensions. As stated previously and common with cabinet woodworking, many cabinets have similar dimensions. Thus, a wood worker needs to rip or cut many similar dimensions multiple times. Thus, the fence stop 52 of the present disclosure enables a cabinet maker or other woodworker to set a desired stop distance to provide an offset for the table saw blade that can be used a plurality of times; however, when another cut is needed, a portion of the fence stop 52, such as lever 108 carrying stop surface 172, may simply pivot down below the rail 50 and enable free passage of the fence 16 thereabove when the lever 108 carrying the stop surface 172 is in the lowered position so that the fence 16 can be moved to an alternate location along the length of rail 18. Then, thereafter, if the user or wood worker needs to return to the original position of the fence stop 52, the user may flip the lever or pivot the lever 108 about the axis 144 upwardly to position the stop surface 172 to its raised second position above the rail 50 to their again engage the stop block or bolt head 210 on the fence assembly or fence 16. The user will know that the offset distance 30 is correct without the need for additional measurement or adjustment.

Figures 10, 11A:
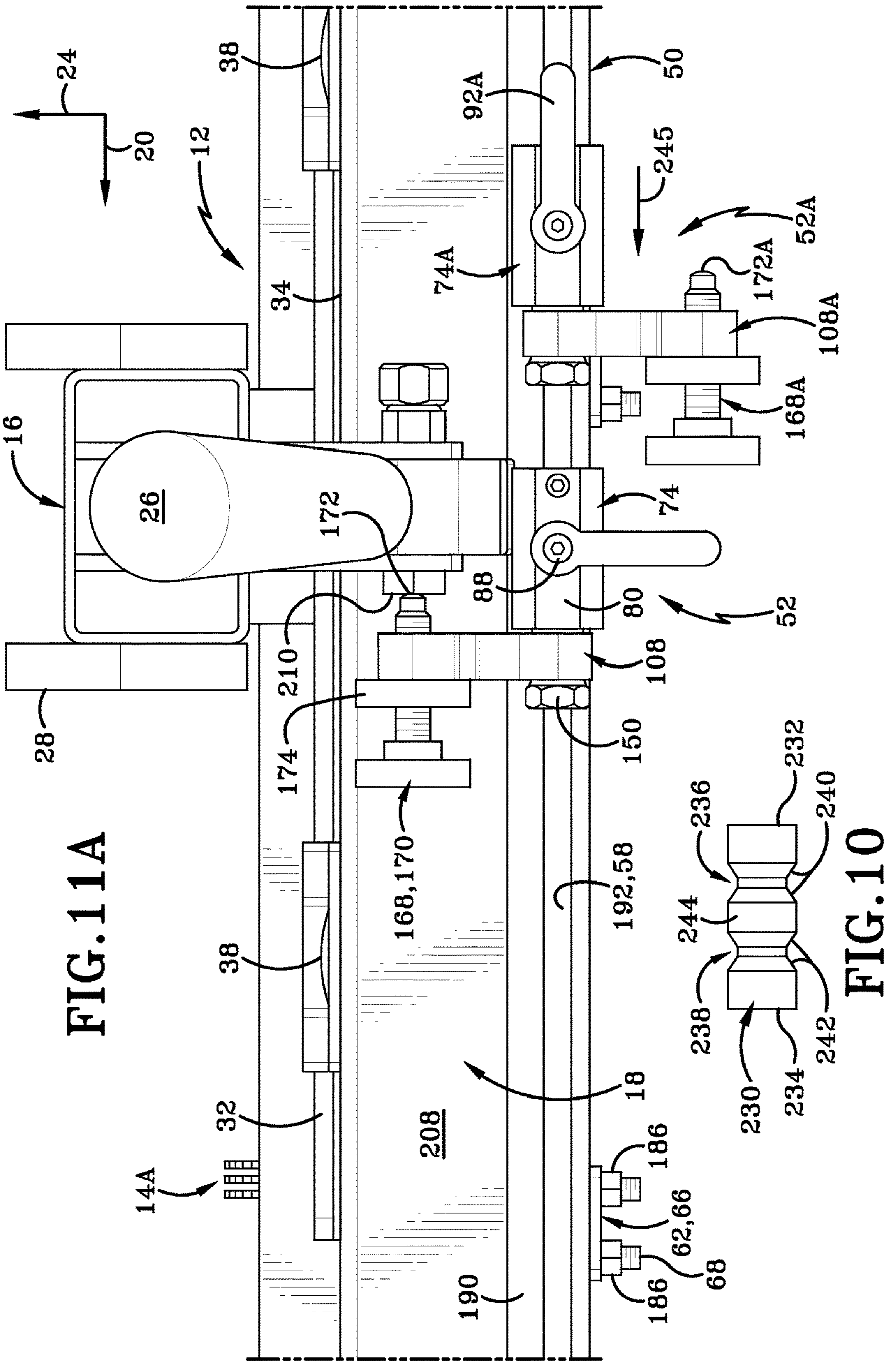
FIG. 10 is a side view of a coupler utilized to mate a first fence stop with a second fence stop.
FIG. 11A is an operational front side elevation view of two fence stops on the rail prior to being coupled together.

FIG. 10 depicts a coupler according to one aspect of the present disclosure. More particularly, an insert coupler 230 has a first end 232 opposite a second end 234. The coupler 230 defines a generally cylindrical body interrupted by two narrowed diameter regions 236 and 238. The first narrowed region 236 is defined by tapered sidewalls 240 and the second narrowed region 238 is defined by tapered sidewalls 242. The first narrowed region 236 is spaced apart from the second narrowed region 238 by a central cylindrical portion 244 having the same outer diameter and cylindrical configuration as the first end 232 and the second end 234. As will be described in greater detail below, the coupler, more particularly insert coupler 230, is utilized to join the first fence stop 52 with the second fence stop 52A as detailed below in FIG. 11A-FIG. 12C and as particularly shown in FIG. 11D.

FIG. 11A depicts the use of the second fence stop 52A in conjunction with first fence stop 52. The second fence stop 52A is slid along the rail 50 as indicated by arrow 245 such that the micro adjustment screw 168A approaches body 74 on first fence stop 52. Handle 92A on second fence stop 52A is shown in the unlocked position which allows the body 74A to slide relative to rail 50 in the direction of arrow 245.

Figure 11B:
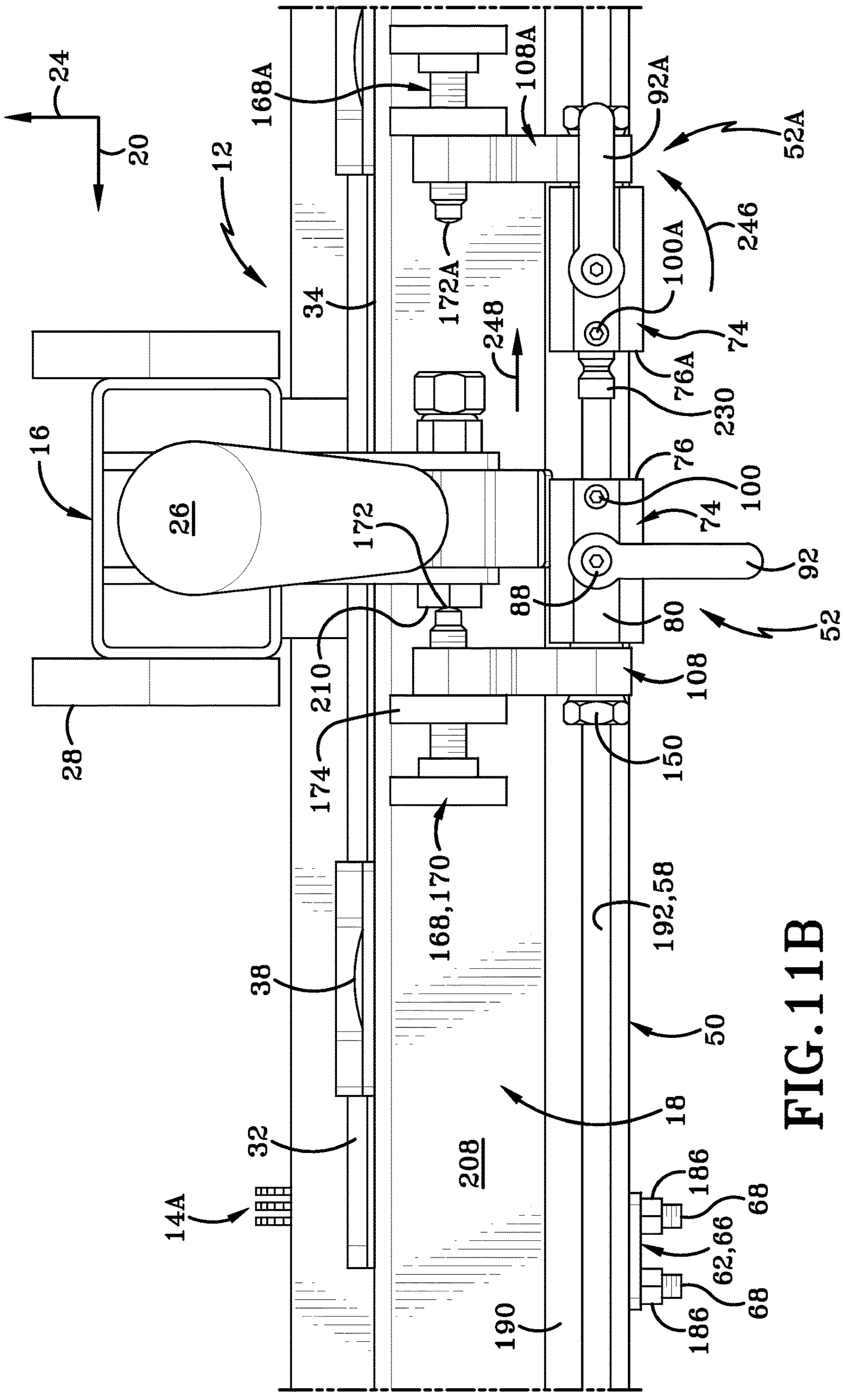
FIG. 11B is an operational front side elevation view of two fence stops on the rail prior to being coupled together, with a rotational movement of the second fence stop occurring to alter its orientation relative to the first fence stop.
Figure 11C:
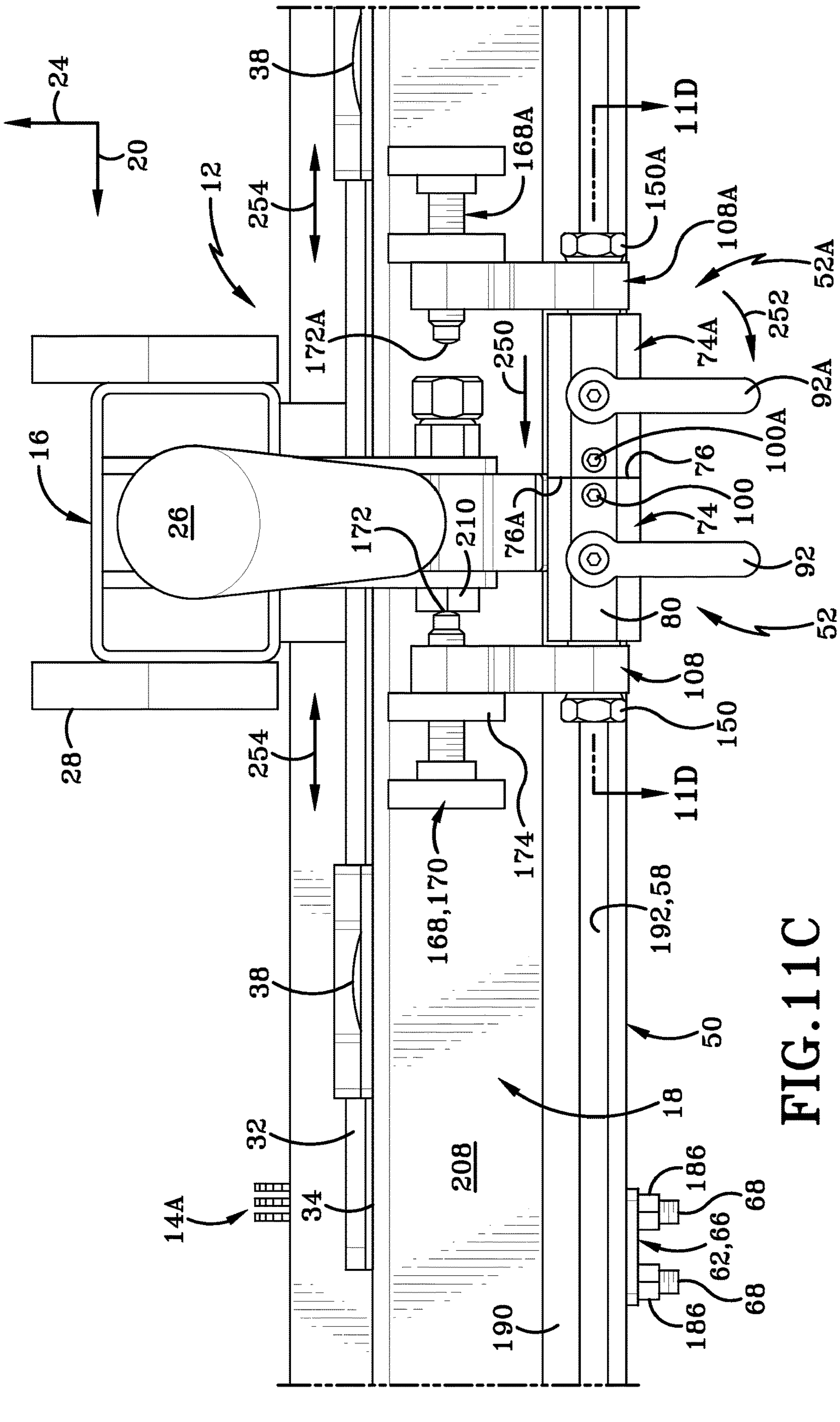
FIG. 11C is an operational front side elevation view of two fence stops on the rail being mated or coupled together.
Figure 11D:
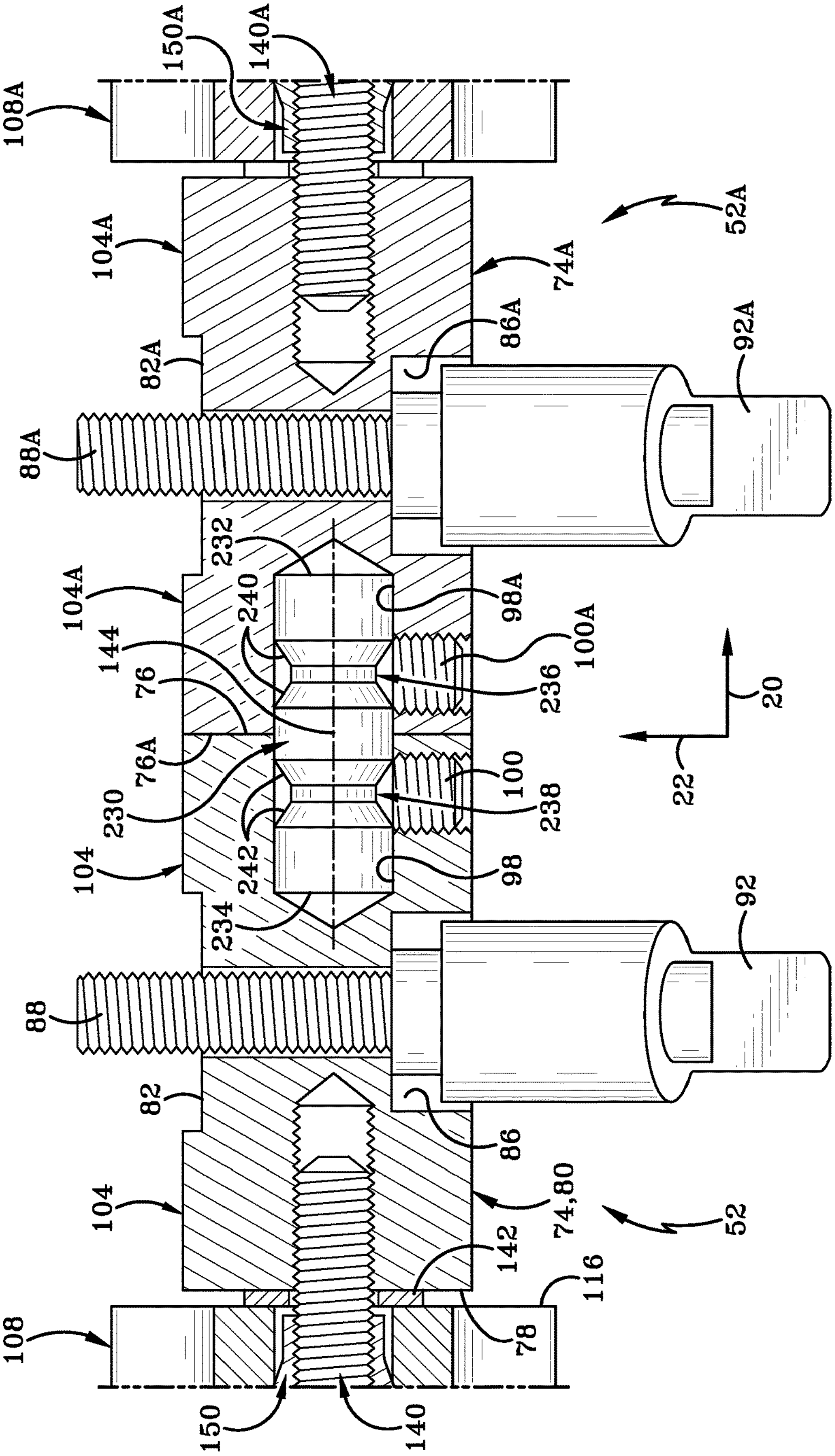
FIG. 11D is longitudinal cross section view of two fence stops mated or coupled together taken along line 11D-11D in FIG. 11C.

FIG. 11B depicts the rotation of the second fence stop 52A about an axis parallel to the second direction or coordinate line 22 wherein the axis of rotation extends along the center of screw 88A (FIG. 11D). The pivoting or rotation of second fence stop 52A is indicated by arrow 246. The handle 92A during rotational movement in the direction of arrow 246 of fence stop 52A is in the unlocked position. When the second fence stop 52A is rotated, the second lever 108A has the ability to move between a raised and lowered position, wherein FIG. 11B depicts the lever 108A in the raised position to position the stop surface 172A on the second fence stop 52A above the rail 50. In FIG. 11B, the second fence stop 52A is moved slightly to the right as indicated by arrow 248 to space the end 76 of first fence stop 52 apart from the end 76A of second fence stop 52A. The coupler or insert coupler 230 is inserted in the bore 98A of the second fence stop 52A and secured with the set screw 100A. The set screw includes a tapered end that complements the tapered sidewalls 240 on coupler 230 to secure the coupler 230 within the bore 98A.

FIG. 11C depicts the operation of the mating or union of the first fence stop 52 and the second fence stop 52A. To form the union of the mated pair of first fence stop 52 and the second fence stop 52A, the second fence stop 52A may be slid towards the first fence stop 52 as indicated by arrow 250. When the first fence stop 52 and the second fence stop 52A are mated or unioned together as a mated pair, the coupler 230 is inserted into the bore 98 of first fence stop 52. The set screw 100 on first fence stop 52 may be engaged into the coupler 230 to secure the tapered end of set screw 100 with the tapered walls 242 of coupler 230. The mated pair of first and second fence stops 52, 52A directly abut the end 76 of body 74 with the end 76A of body 74A. Handle 92A may then be rotated about the axis defined by screw 88A as indicated by arrow 252 to lock the second fence stop 52A, and more particularly lock the body 74A of second fence stop 52A, to the rail. The configuration of FIG. 11C is utilized to cut a dado or multiple dados in a piece of wood. The dado cut is effectuated by a dado blade configuration 14A having more than one cutting blade. Effectuating a dado cut allows a slight amount of travel between the stop surface 172 and the stop surface 172A as indicated by the directional movement arrow 254.

FIG. 11D depicts the mated pair of the first fence stop 52 and the second fence stop 52A in cross section. When mated, the coupler 230 extends along axis 144 centrally through the first and second fence stops 52, 52A. The coupler is positioned within the respective bores 98, 98A of the first and second fence stops 52, 52A. Set screw 100 on first fence stop 52 is disposed within the tapered region defined by tapered walls 242 on coupler 230 and the set screw 100A on the second fence stop 52A is disposed within the tapered region defined by tapered walls 240 on coupler 230. First end 76A on fence stop 52A directly abuts first end 76 on fence stop 52. The screws 88, 88A perpendicularly intersect axis 144 to allow the rotation of handles 92, 92A, respectively, to lock the respective bodies 74, 74A to the rail 50. When both handles 92, 92A are unlocked, the mated pair of fence stops 52, 52A may slide along the rail in unison via their respective slide nuts 70, 70A.

Figure 11E:
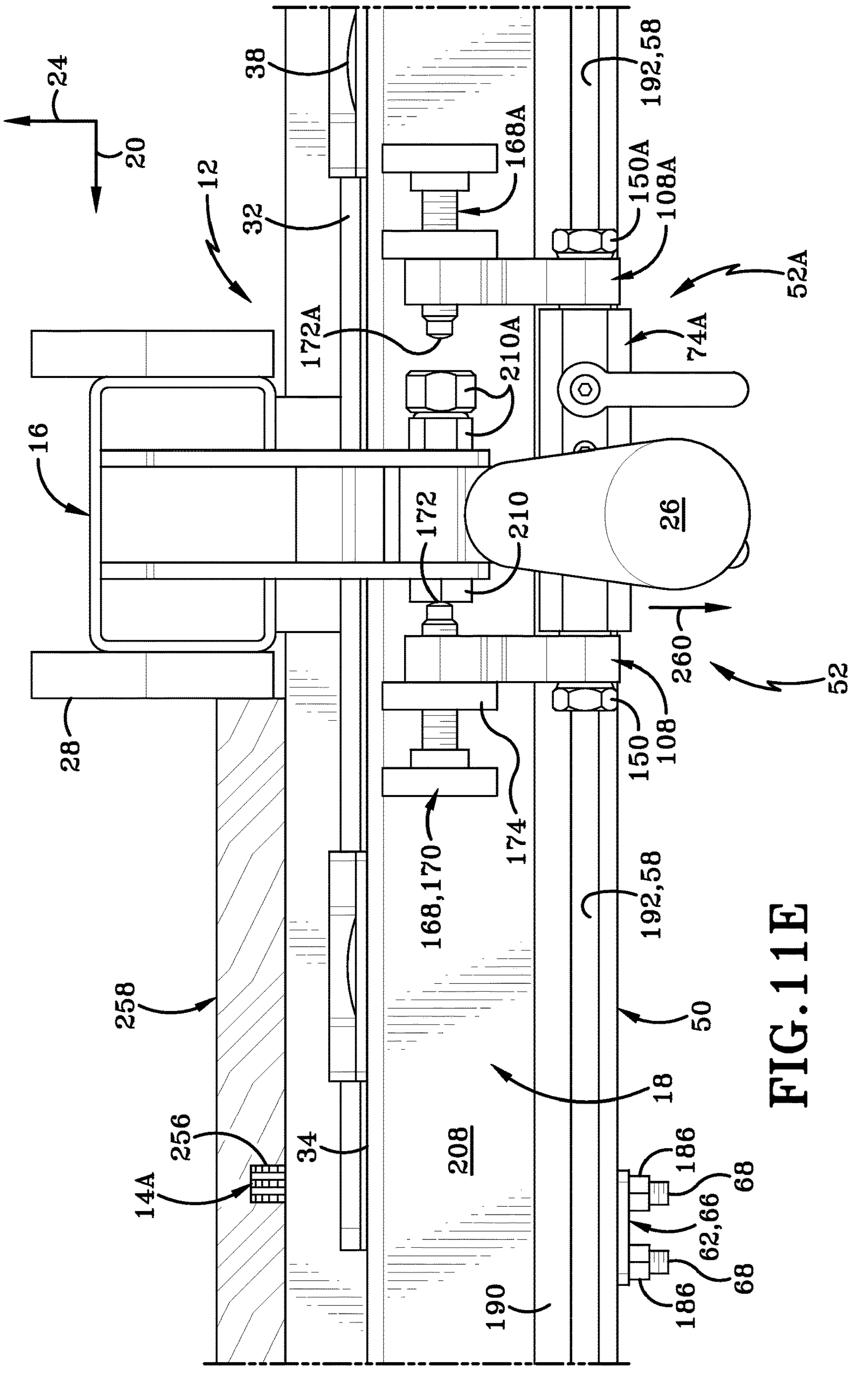
FIG. 11E is an operational front side elevation view of two fence stops on the rail mated or coupled together to perform a first dado cut in a piece of wood or board.

FIG. 11E depicts the cutting of the first portion of a dado 256 within a piece of wood 258 utilizing dado blade 14A. To effectuate the dado cut or dado 256 in wood 258, the handle 26 of fence 16 is moved downwardly in a direction parallel to coordinate line 24 to lock the fence in a first position in which the stop surface 172 engages stop block 210. The dado is cut by moving the wood 258 parallel to the second direction or parallel to coordinate line 22 to rip the wood 258 to create the dado 256.

Figure 11F:
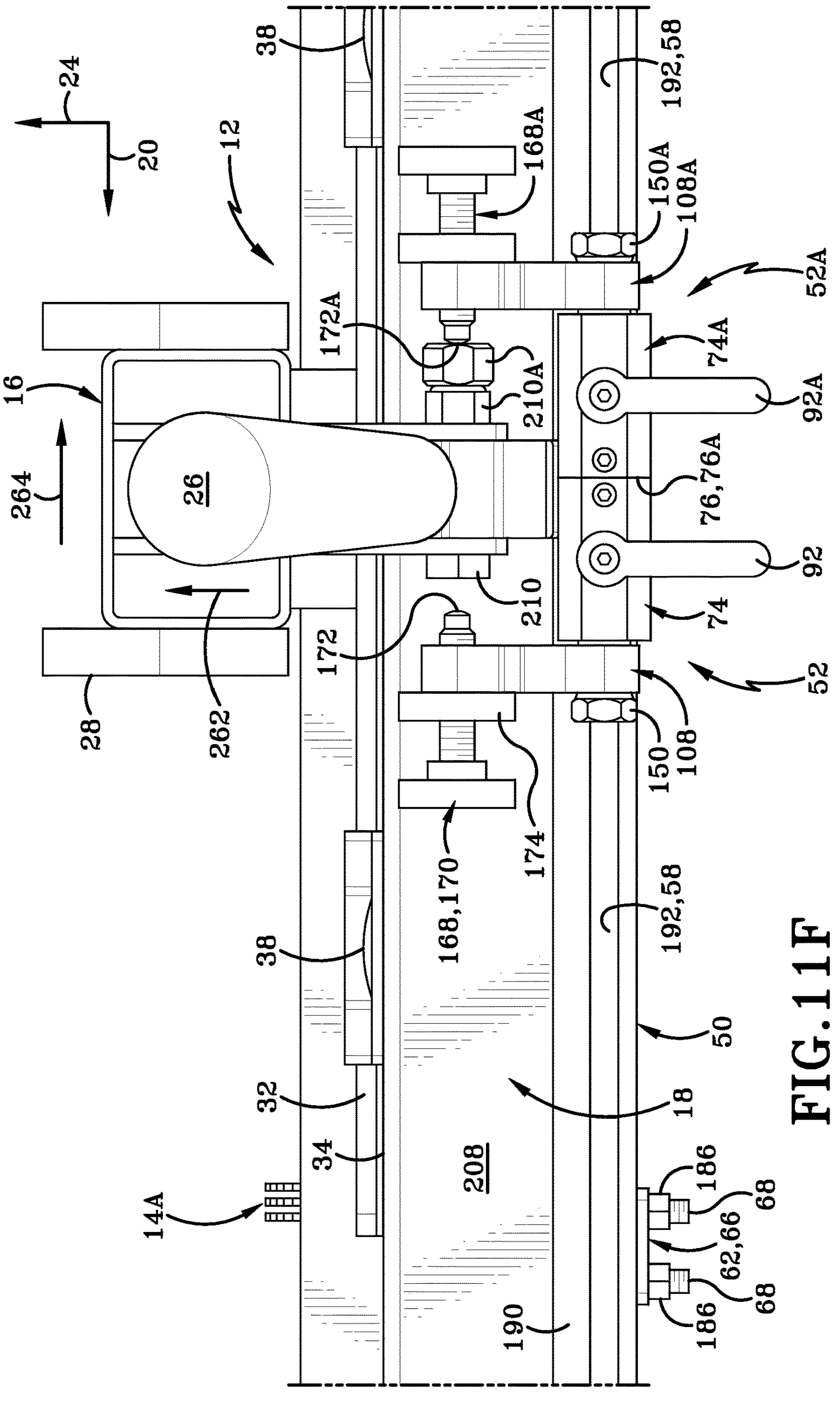
FIG. 11F is an operational front side elevation view of two fence stops on the rail mated or coupled together and the fence being unlocked and moved as an intermediary step prior to cutting a second dado cut.

FIG. 11F depicts the removal of wood 258 and the unlocking of handle 26 as indicated by arrow 262 and moving the fence 16 in a direction parallel to the first direction or parallel to coordinate line 20 as indicated by arrow 264. This will engage the second stop surface 172A with a second stop block 210A on fence 16.

Figure 11G:
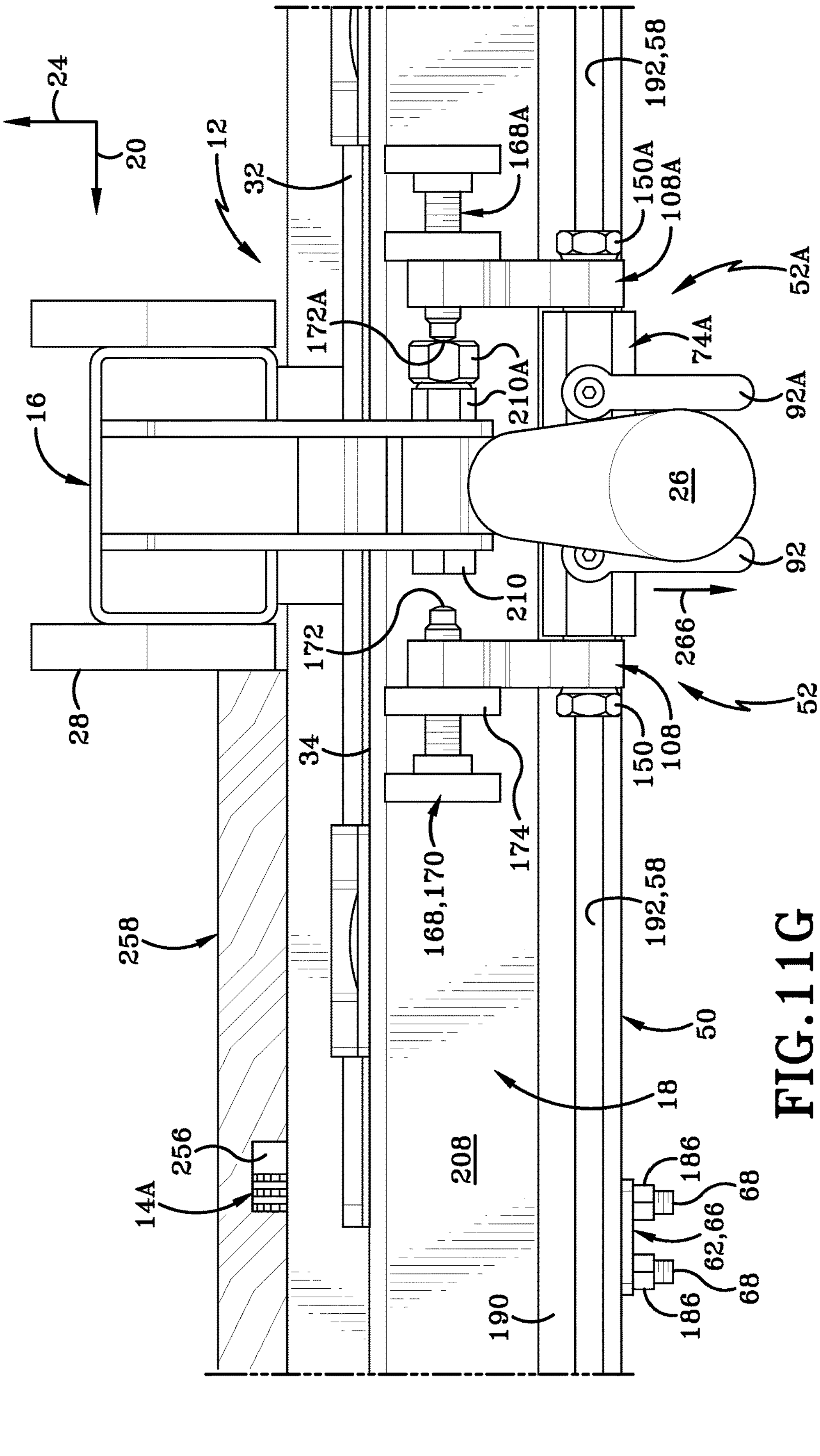
FIG. 11G is an operational front side elevation view of two fence stops on the rail mated or coupled together and the fence being locked and for cutting a second dado cut in the piece of wood or board.

FIG. 11G depicts that the handle 26 may be returned to its locked position by locking the fence at a desired location by moving handle 26 downwardly as indicated by arrow 266. The dado 256 may be cut again by ripping wood 258 in a cutting direction parallel to the first direction to widen the width or increase the cut of the dado 256 via dado saw 14A.

While not shown in FIG. 11A-FIG. 11G, it is to be understood that the micro adjustment mechanism or feature could be implemented to adjust the size of the dado 256 as necessary by rotating the respective thumbscrews 170, 170A on the first and second fence stops 52, 52A.

Figure 12A:
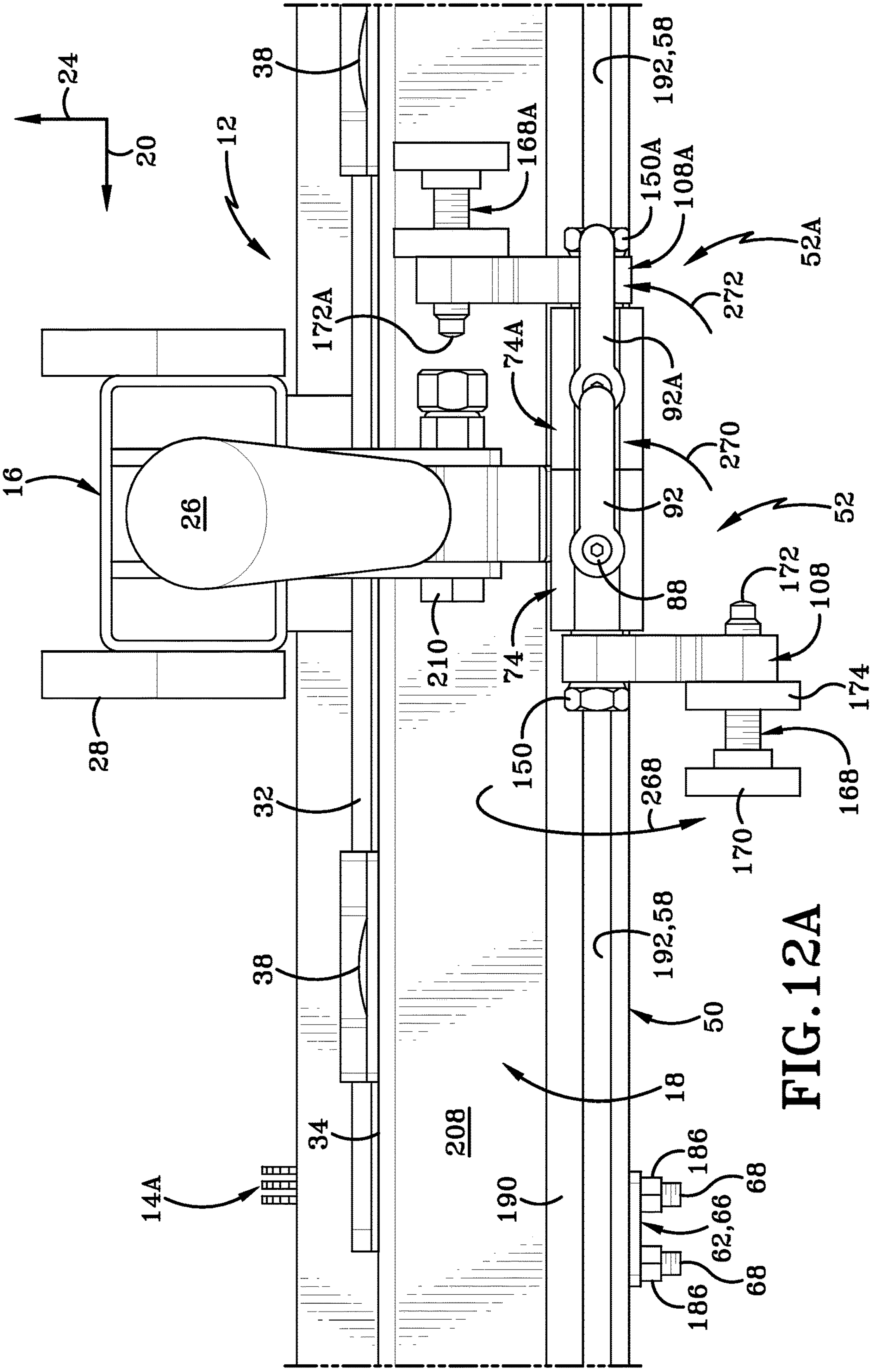
FIG. 12A is an operational front side elevation view of two fence stops on the rail mated or coupled together and the one fence stop being rotated to a lowered position and the mated pair being unlocked to slide along the rail so the lowered fence stop can slide below the fence assembly.
Figure 12B:
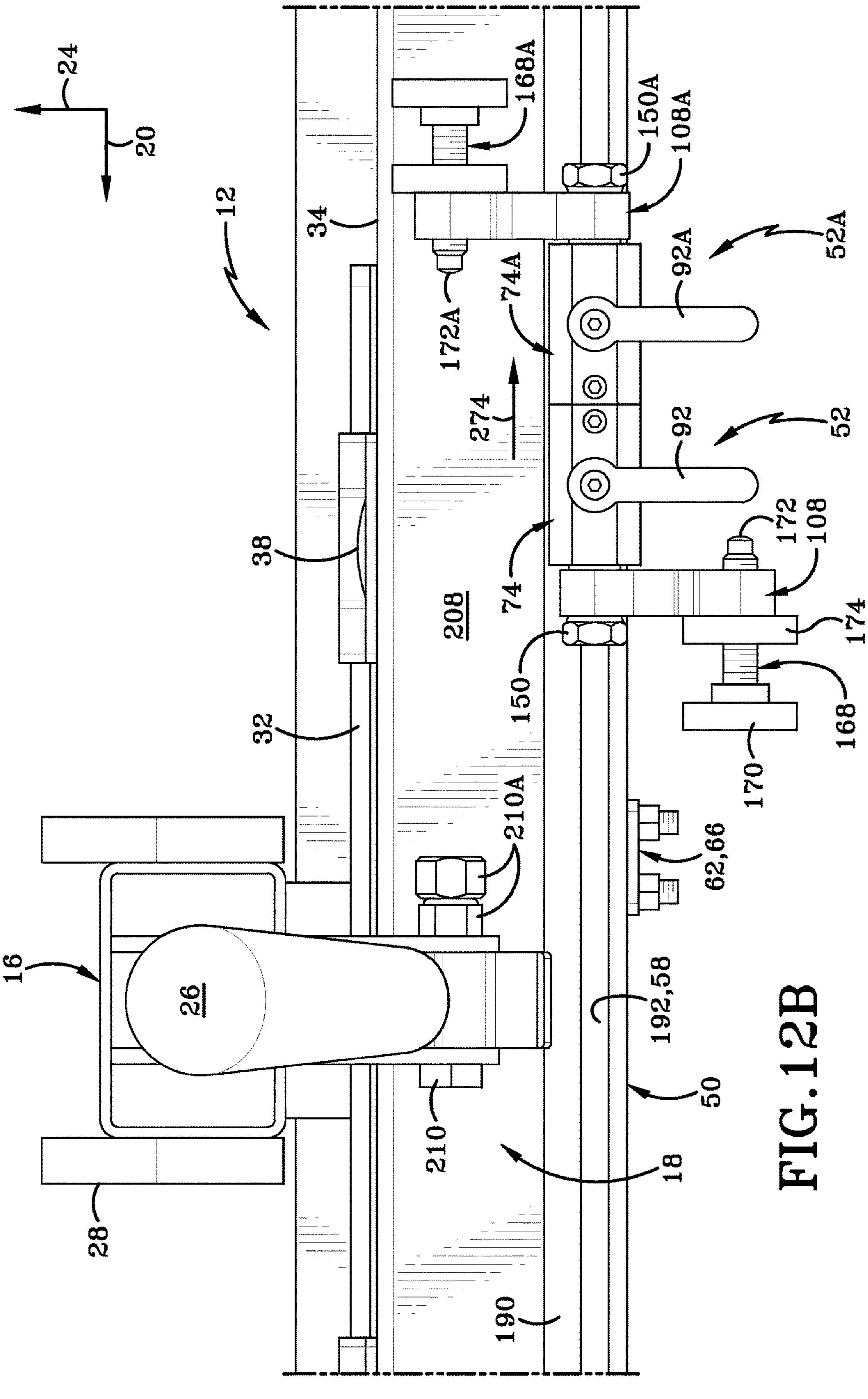
FIG. 12B is an operational front side elevation view of two fence stops on the rail mated or coupled together having been slid to another location along the rail with one fence stop still in the lowered first position after having been slid along the rail and the lowered fence having slid below the fence assembly.
Figure 12C:
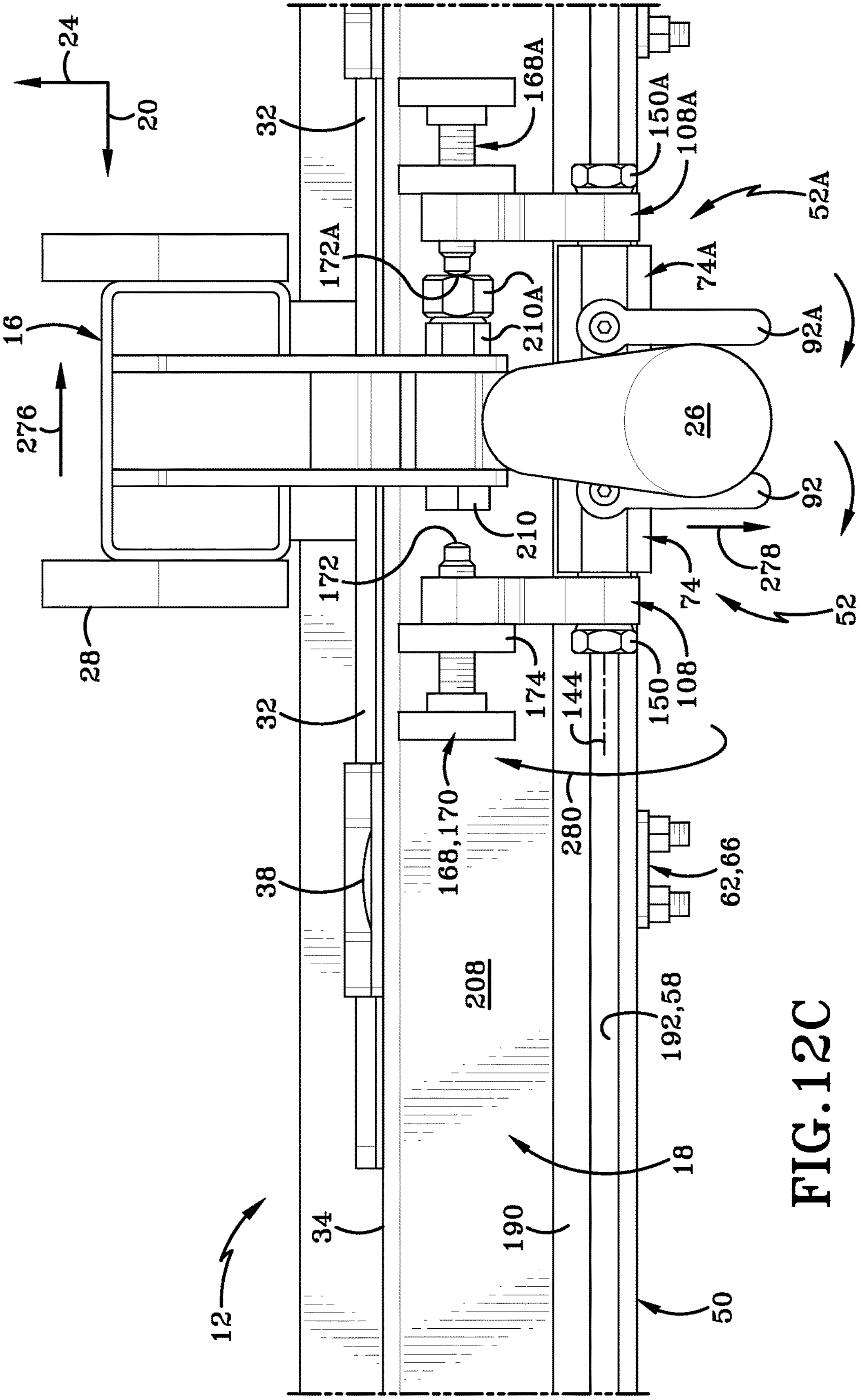
FIG. 12C is an operational front side elevation view of two fence stops on the rail mated or coupled together with the tables saw fence assembly moved between the two respective stop surfaces on the mated fence stops and both fence stops in their respective raised second position.

FIG. 12A-FIG. 12C depict the operation of moving the mated pair of first and second fence stops 52, 52A to create another dado having a different offset distance from that which was described previously in FIG. 11A-FIG. 11G. Particularly, if another dado having a different offset from the fence sidewall 28 is desired, the lever 108 on the first fence stop 52 may be lowered. Particularly, the stop surface 172 is moved from its raised position (i.e., second position) to its lowered position (i.e., first position) by rotating the lever 108 about axis 144 as indicated by arrow 268. Then, the handles 92, 92A may be rotated counterclockwise as indicated by arrows 270, 272, respectively. The counterclockwise rotation of handles 92, 92A loosens the bodies 74, 74A so that the mated pair of fence stops 52, 52A may slide along the longitudinal length of rail 50 in unison. Lowering the lever 108 to position the stop surface 172 below the rail 50 enables the mated pair to slide beneath the handle 26 of fence 16. As shown in FIG. 12B, the mated pair slides along the longitudinal length of the rail as indicated by arrow 274 such that the lever 108 passes beneath the handle 26 on fence 16. The handles 92, 92A may be returned to their locked position by rotating them clockwise. This provides an engagement of the fence stop 52, 52A as a mated pair to be selectively joined to the rail 50.

As shown in FIG. 12C, the fence 16 may be moved as indicated by arrow 276 to engage the stop block 210A with second stop surface 172A. The handle 26 may be lowered to lock the fence in a desired position as indicated by arrow 278. Thereafter, lever 108 may be pivoted upwardly about axis 144 as indicated by arrow 280 to position the stop surface 172 above the rail 50 so that it may be ready to engage stop block 210 to cut another dado 256 in wood 258 in the manner described in FIG. 11A-FIG. 11G but having a different offset distance than that which was previously described.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The term "slidable" as used herein means capable of sliding or able to be slid.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A method comprising:

coupling a rail of a fence stop system to a portion of a table saw assembly having a table saw fence;

coupling a first fence stop having a lever to the rail, wherein the lever includes a first end and a second end, and a first surface and a second surface that extends between the first end and the second end, wherein the lever moves about an axis that is parallel to the rail, and wherein the second surface at the first end of the lever is attached to an outer surface of a body of the first fence stop; and moving a stop surface that is carried by the second end of the lever vertically between a lowered first position and a raised second position, wherein when the stop surface is in the raised second position the stop surface abuts a portion of the table saw fence and when the stop surface is in the lowered first position the stop surface does not contact the table saw fence.

2. The method of claim 1, further comprising:

sliding the first fence stop along the rail with the stop surface in the lowered first position; and sliding the first fence stop along the rail with the stop surface in the raised second position.

3. The method of claim 2, wherein sliding the first fence stop along rail moves the first fence stop in a direction perpendicular to a cutting direction of the table saw assembly.

4. The method of claim 1, further comprising:

moving the stop surface via a micro adjustment mechanism on the first fence stop.

5. The method of claim 4, wherein moving the stop surface is accomplished by imparting linear translation to the stop surface via rotational action of a portion of the micro adjustment mechanism.

6. The method of claim 5, further comprising:

rotating a thumbwheel on the micro adjustment mechanism to linearly translate the stop surface.

7. The method of claim 6, further comprising:

locking the stop surface at a selected location via a lock wheel on the micro adjustment mechanism.

8. The method of claim 1, further comprising:

moving the stop surface from the raised second position to the lowered first position; and sliding the first fence stop along the rail below the table saw fence to an opposite side of the table saw fence.

9. The method of claim 1, further comprising:

moving the stop surface from the raised second position to the lowered first position; and moving the table saw fence over the first fence stop to position the first fence stop on an opposite side of the table saw fence.

10. The method of claim 1, further comprising:
unlocking the first fence stop relative to the rail such that the first fence stop may slide along the rail;
unlocking a lock handle on the table saw fence;
contacting a stop block on the table fence with the stop surface on the first fence stop; and
moving the table saw fence and the first fence stop in unison while the stop block contacts the stop surface on the first fence stop.

11. The method of claim 1, further comprising:
moving the stop surface via a micro adjustment mechanism on the first fence stop, wherein the stop surface is a generally planar surface oriented perpendicular to a central axis.

12. The method of claim 1, further comprising:
moving the stop surface via a micro adjustment mechanism;
locking the stop surface in a desired position.

13. The method of claim 12, wherein locking the stop surface is accomplished by rotating a lock wheel having threads that correspond to threads on the micro adjustment mechanism.

14. The method of claim 13, further comprising:
engaging a surface on the lock wheel with a surface on a lever coupled to the first fence stop.

15. The method of claim 1, further comprising:
moving the stop surface via a micro adjustment mechanism on the first fence stop when the stop surface is in the raised second position.

16. The method of claim 1, wherein moving the stop surface vertically between the lowered first position and the raised second position is accomplished by revolving the stop surface about an axis.

17. A method comprising:
effecting a rail of a fence stop system to be coupled to a portion of a table saw assembly having a table saw fence, wherein the rail defines a channel;
effecting a first fence stop to be coupled to the rail;
effecting the first fence stop to be slid along the rail;
effecting a stop surface to be moved vertically between a lowered first position and a raised second position, wherein when the stop surface is in the raised second position the stop surface abuts a portion of the table saw fence and when the stop surface is in the lowered first position the stop surface does not contact the table saw fence;
effecting a second fence stop to be coupled to the rail;
effecting the first fence stop and the second fence stop to be coupled together via a coupler, wherein a first end of the coupler is connected to the first fence stop and the second end of the coupler is connected to the second fence stop; and
effecting the first fence stop and the second fence stop to be slid along the rail as a mated pair.

18. A method comprising:
coupling a rail of a fence stop system to a portion of a table saw assembly having a table saw fence, wherein the rail defines a channel;
coupling a first fence stop to the rail, wherein the first fence stop has a first stop surface adapted to engage a first side of the table saw fence;
coupling a second fence stop to the rail, wherein the second fence stop has a second stop surface adapted to engage a second side of the table saw fence;
coupling the first fence stop to the second fence stop via a coupler, wherein a first end of the coupler is connected to the first fence stop and the second end of the coupler is connected to the second fence stop;
sliding the first fence stop and the second fence stop along the rail as a mated pair; and
disposing a portion of the table saw fence between the first stop.

* * * * *